US010081308B2

(12) United States Patent
Kuehnle et al.

(10) Patent No.: US 10,081,308 B2
(45) Date of Patent: Sep. 25, 2018

(54) IMAGE-BASED VEHICLE DETECTION AND DISTANCE MEASURING METHOD AND APPARATUS

(75) Inventors: Andreas U. Kuehnle, Villa Park, CA (US); Jeffrey S. Lawson, Corona, CA (US); Dilip Swaminathan, Irvine, CA (US); Cathy L. Boon, Orange, CA (US); Chandra Sekhar Gatla, Fountain Valley, CA (US); Hans M. Molin, Mission Viejo, CA (US); Ken D. Au, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1004 days.

(21) Appl. No.: 14/131,297

(22) PCT Filed: Jul. 9, 2012

(86) PCT No.: PCT/US2012/045949
§ 371 (c)(1),
(2), (4) Date: Apr. 21, 2014

(87) PCT Pub. No.: WO2013/009697
PCT Pub. Date: Jan. 17, 2013

(65) Prior Publication Data
US 2014/0293052 A1    Oct. 2, 2014

Related U.S. Application Data

(60) Provisional application No. 61/505,870, filed on Jul. 8, 2011.

(51) Int. Cl.
*B60R 11/02* (2006.01)
*G06K 9/00* (2006.01)
*G06T 7/73* (2017.01)

(52) U.S. Cl.
CPC .......... *B60R 11/02* (2013.01); *G06K 9/00791* (2013.01); *G06T 7/73* (2017.01);
(Continued)

(58) Field of Classification Search
CPC .......... G06K 9/00805; G06K 9/00798; G06K 9/00825; G06K 9/00771; G06K 9/00335;
(Continued)

(56) References Cited

U.S. PATENT DOCUMENTS

| 3,069,654 | A | 12/1962 | Hough |
| 5,832,117 | A | 11/1998 | Harris |

(Continued)

FOREIGN PATENT DOCUMENTS

| EP | 0918292 A2 | 5/1999 |
| EP | 2288138 A1 | 2/2011 |

OTHER PUBLICATIONS

International Search Report and the Written Opinion of the International Searching Authority for PCT/US12/45949 dated Nov. 20, 2012 (14 pages).

*Primary Examiner* — Dave Czekaj
*Assistant Examiner* — Kehinde O Abimbola
(74) *Attorney, Agent, or Firm* — Tucker Ellis LLP

(57) ABSTRACT

In an example embodiment, an image based vehicle detection and measuring apparatus that employs an accelerated, structured, search method is described for quickly finding the extrema of a multivariable function. The input domain of the function is determined. The method exploits information as it becomes available, calculating a best possible value with the information available so far, and terminating further evaluation when the best possible value does not exceed the extreme value found so far. Ordering and best guess schemes are added to the best possible value idea to accelerate it further. The method is applied to speed up an image pro- (Continued)

cessing problem, an example of which is given, but has general application, for example, in fields such as vehicle detection.

38 Claims, 23 Drawing Sheets

(52) U.S. Cl.
CPC ............... *G06T 2207/10016* (2013.01); *G06T 2207/30261* (2013.01)

(58) Field of Classification Search
CPC ............. G06K 9/0014; G06K 2209/09; G06K 9/00791; G06K 9/4604; G06K 9/4609; B60W 2420/42; B60W 30/09; B60W 10/20; B60W 2550/142; G06F 17/5018; G06F 2217/16; G06F 2217/42; G06F 17/11; G06F 17/3056; G06F 17/30648; G06F 17/30743; G06F 17/30749; G06F 17/30758; G06F 17/30761; G06F 17/30772; G06F 17/3097
See application file for complete search history.

(56) References Cited

U.S. PATENT DOCUMENTS

| | | | |
|---|---|---|---|
| RE36,656 E | 1/2000 | Califano | |
| 6,285,372 B1 | 9/2001 | Cowsar | |
| 6,502,852 B2 * | 1/2003 | Kassman | B60R 21/2165 280/728.3 |
| 6,590,521 B1 | 7/2003 | Saka | |
| 6,952,449 B2 | 10/2005 | Kawada | |
| 6,990,216 B2 * | 1/2006 | Yamamura | B60K 31/0008 382/104 |
| 7,038,577 B2 | 5/2006 | Pawlicki | |
| 7,110,454 B1 | 9/2006 | Chakraborty | |
| 7,221,789 B2 * | 5/2007 | Honda | G06K 9/3241 382/154 |
| 7,262,710 B2 | 8/2007 | Watanabe | |
| 7,283,645 B2 | 10/2007 | Krumm | |
| 7,409,092 B2 | 8/2008 | Srinivasa | |
| 7,440,011 B2 | 10/2008 | Fleury | |
| 7,453,939 B2 | 11/2008 | Pan | |
| 7,623,680 B2 * | 11/2009 | Takahama | B60R 1/00 382/104 |
| 7,724,962 B2 | 5/2010 | Zhu | |
| 7,738,730 B2 | 6/2010 | Hawley | |
| 7,764,808 B2 | 7/2010 | Zhu | |
| 8,098,889 B2 | 1/2012 | Zhu | |
| 8,150,207 B2 | 4/2012 | Li | |
| 8,180,158 B2 | 5/2012 | Wu | |
| 8,363,972 B1 | 1/2013 | Silver | |
| 8,457,844 B2 * | 6/2013 | Widmann | B60R 1/00 180/204 |
| 8,489,283 B2 * | 7/2013 | Widmann | B60R 1/00 180/204 |
| 8,693,788 B2 * | 4/2014 | Wojton | A61B 5/0013 382/133 |
| 9,041,806 B2 * | 5/2015 | Baur | B60R 1/00 340/903 |
| 2002/0057195 A1 * | 5/2002 | Yamamura | B60K 31/0008 340/435 |
| 2002/0060446 A1 * | 5/2002 | Kassman | B60R 21/2155 280/728.3 |
| 2004/0057601 A1 * | 3/2004 | Honda | G06K 9/3241 382/104 |
| 2005/0059251 A1 | 3/2005 | Kao | |
| 2005/0102070 A1 * | 5/2005 | Takahama | G01C 21/26 701/1 |
| 2005/0213667 A1 | 9/2005 | Aldrich | |
| 2006/0002587 A1 * | 1/2006 | Takahama | B60R 1/00 382/103 |
| 2006/0062432 A1 | 3/2006 | Watanabe | |
| 2007/0223817 A1 | 9/2007 | Ulrich | |
| 2008/0043831 A1 | 2/2008 | Sethuraman | |
| 2008/0069402 A1 | 3/2008 | Dhua | |
| 2008/0273752 A1 | 11/2008 | Zhu | |
| 2009/0116738 A1 | 5/2009 | Kubota | |
| 2010/0202657 A1 | 8/2010 | Salgian | |
| 2011/0164816 A1 | 7/2011 | Guo | |
| 2011/0211071 A1 | 9/2011 | Kuehnle | |
| 2012/0033863 A1 * | 2/2012 | Wojton | A61B 5/0013 382/128 |
| 2012/0154591 A1 * | 6/2012 | Baur | B60R 1/00 348/148 |
| 2013/0151059 A1 * | 6/2013 | Widmann | B60R 1/00 701/23 |
| 2013/0297197 A1 * | 11/2013 | Zhai | B60W 30/12 701/408 |
| 2015/0251602 A1 * | 9/2015 | Baur | B60R 1/00 348/148 |

* cited by examiner

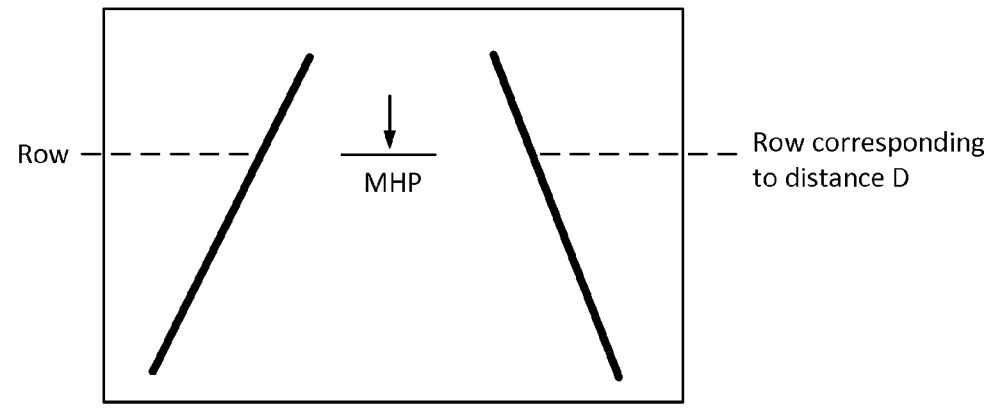
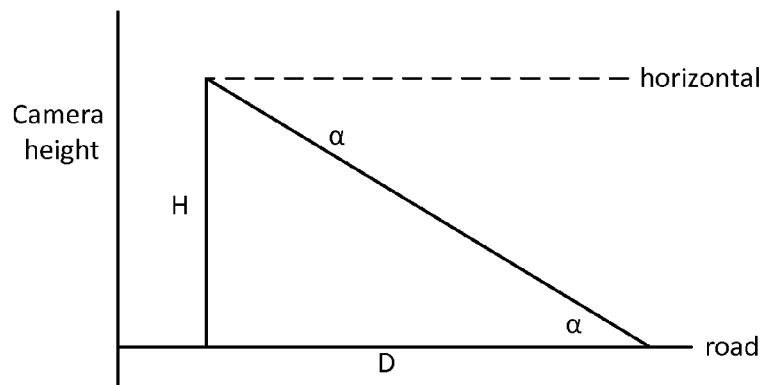
$$\alpha = \tan^{-1}\left(\frac{H}{D}\right)$$
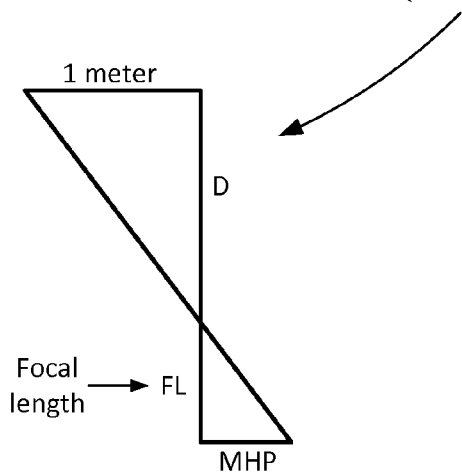
FIG. 6

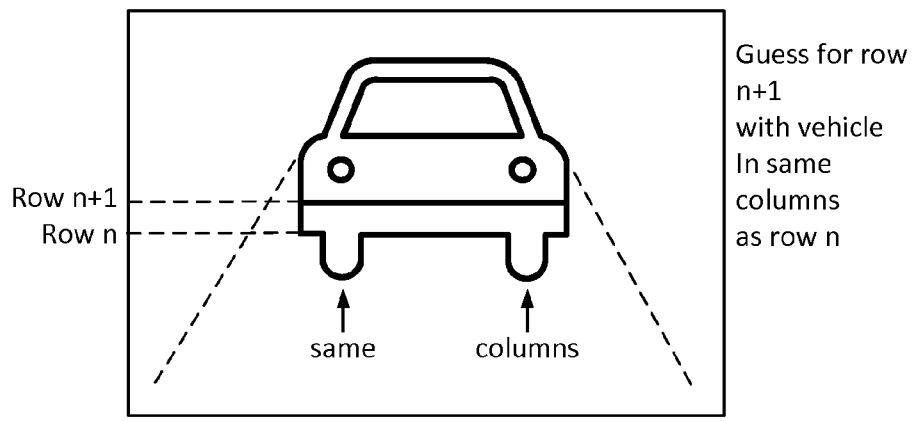
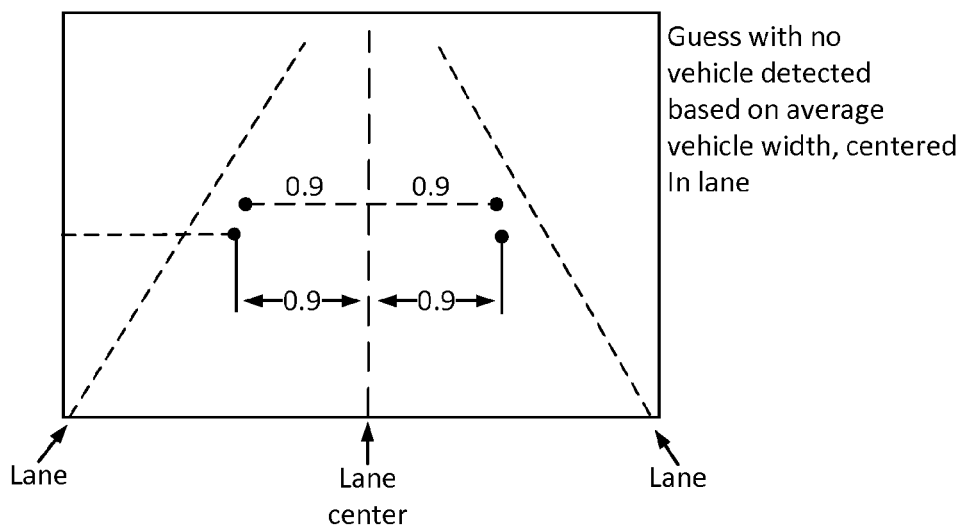
FIG. 7

Possible rules: 1. length beats strength,
Keeps 9 long.
2. Strength beats length,
Keeps 2 long.
3. Length beats strength,
Strength thresholded, keeps A pixels since strength ratio not > thr.

Bottom based ranging, when bottom is visible

Width-based ranging, when bottom is not visible or not plausible, image width is inversely proportional to range D.

$$D = \text{Assumed Separation} \times \frac{\text{Focal Length of Lens}}{\text{Physical Separation in Image}}$$

IMAGE-BASED VEHICLE DETECTION AND DISTANCE MEASURING METHOD AND APPARATUS

CROSS REFERENCE TO RELATED APPLICATIONS

This application is based on and claims priority to International Application No. PCT/US12/45949, having the International filing date of Jul. 9, 2012, the disclosure of which is included herein by reference in its entirety, which claims priority to U.S. provisional patent application Ser. No. 61/505,870, filed Jul. 8, 2011.

TECHNICAL FIELD

The present disclosure relates generally to vehicular image processing. More specifically, particular embodiments of the disclosure relate to an image-based vehicle detection and measurement apparatus and image processing methods for forward collision warning systems.

BACKGROUND

Existing approaches to vehicle detection often include the use of active sensors, such as lasers, lidar, or millimeter-wave radars. These detect the distance of an object by measuring the travel time of a signal emitted by the sensors and reflected by the object. Such sensors have a variety of drawbacks, such as low spatial resolution and slow scanning speed. Additionally, when a large number of vehicles are moving simultaneously in the same direction, interference among sensors of the same type may pose a big problem.

Passive sensors, such as for example optical sensors in cameras, are also known approaches to vehicle detection. These types of sensors are lower cost and acquire data in a less intrusive manner than active sensors. However, there are large variables in the use of optical sensors that make vehicle detection challenging and problematic. For example, vehicles vary widely in color, size and shape, and their appearance to a camera is often inconsistent or unclear, resulting in unreliable accuracy. Also, the presence of other objects, changes in vehicle speed and location, environmental conditions such as changes in illumination, unpredictable interaction with other vehicles and behavior of other vehicles, and other background noise add to difficulty in arriving at accurate and reliable results.

Regardless of the type of sensor, another issue with existing approaches involves time needed to processes images sensed. Most approaches involve capturing large images of entire vehicles, yet driver assistance applications and vehicle detection algorithms need to process images very quickly, in real-time or as close to real-time as possible. Searching entire images to determine vehicle locations and process a potential warning the driver with enough time to react is often not possible or realistic.

BRIEF DESCRIPTION OF THE DRAWINGS

The accompanying drawings incorporated herein and forming a part of the specification illustrate the example embodiments.

FIG. 6 illustrates an example of a Meter Horizontally in Pixels (MHP) calculation.

FIG. 7 is a diagram illustrating an example of exploiting the structure and expected location of vehicles to determine vehicle presence.

OVERVIEW OF EXAMPLE EMBODIMENTS

Figure 1:
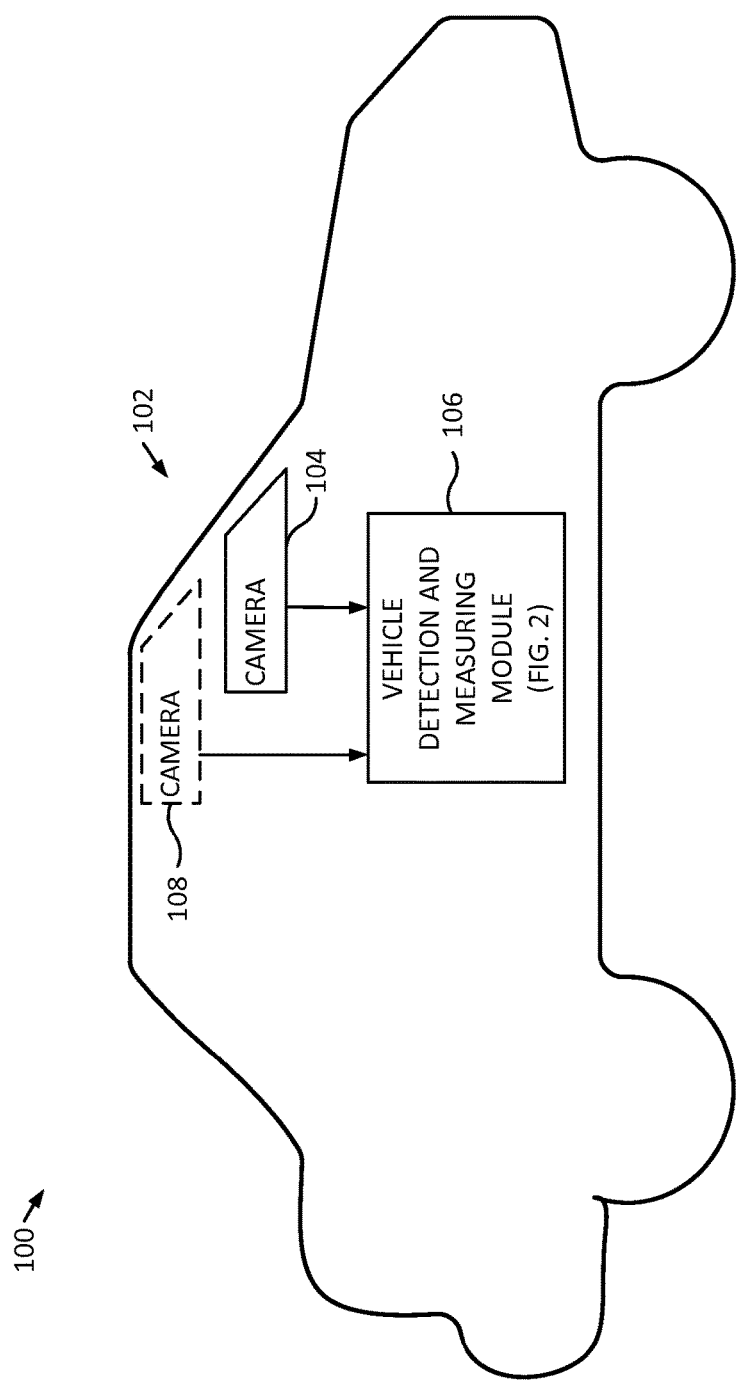
FIG. 1 illustrates an example of a vehicle with an image based vehicle detection and distance measuring system.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Detecting the presence of other vehicles in proximity to one's own vehicle and measuring the distance to them are fundamental parts of driving. An example embodiment describes a vision-based image processing system for detecting the presence of other vehicles. The presence or absence of vehicles is ascertained by analyzing images, using geometry-based calculations to provide the range to those vehicles. The system forms a basis for safer or automatic driving.

An example embodiment receives a detected image and pre-processes that detected image to locate vehicles in the image. Persistently present vehicles form tracks whose characteristics provide range information. The range information is then used to warn the driver, control the vehicle, log dangerous incidents, or otherwise support driving.

Vehicles are detected by looking for U or H shapes in an image, and the range to them is measured, using a flat road assumption or the relation between width and range. Detection, distance and measurement are done differently for daytime and nighttime driving conditions.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 illustrates an example of a vehicle 100 equipped with an image based vehicle detection and distance measuring system 102. The image based vehicle detection and distance measuring system 102 comprises an image capturing device 102, which in this example is a camera, however those skilled in the art should readily appreciate that any suitable image capturing device may be employed by image based vehicle detection and distance measuring system 102, and vehicle detection and measuring module 106 that is coupled with the image capturing device 104.

The vehicle detection and measuring module 106 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Optionally, in particular embodiments image based vehicle detection and distance measuring system 102 comprises an additional image capturing device (e.g., a camera) 108. Although the example in FIG. 1 illustrates two image capturing devices (cameras), those skilled in the art should readily appreciate that image based vehicle detection and distance measuring system 102 may suitably comprise any physically realizable number of image capturing devices. In operation, image data from image capturing device 104, and optionally image processing device 108 if present, is provided to vehicle detection and measuring module 106. The operation of vehicle detection and measuring module will now be explained with reference to FIG. 2.

The image-based vehicle detection and distance measuring processing module 106 detects vehicles and measures distance based on edge segments and dark pixels during the day, and on bright areas at night. The edges and dark pixels are assembled into U or H shapes that surround the boundary of a vehicle. Rules describe the acceptable shapes, thus separating vehicles from the background. At nighttime, rules describe the pairing of the bright areas and identify the vehicles' left and right taillights to separate the vehicles from the background. The range to the vehicle can be estimated by using a flat road model or the relation between vehicle width in the image and distance. A scheme of pyramid resolution-reduced images can be used to maintain approximately constant processing times regardless of vehicle size. Edges are identified from locations of contiguous weak gradients. Dark image sections are located. As will be described in further detail herein, a tracking module 202 receives the identified U and H shapes, identifies the regions of persistent detection, and creates tracks to the vehicles in the image, producing range, range rate, vehicle width and location information. The range and range rate signals are used to produce headway and time to collision warnings, as well as to trigger data recording if so desired.

In an example embodiment, the presence of a vehicle is detected and the range to the vehicle is measured. Different image processing techniques are used depending on whether the vehicle detection and measuring module 106 detects a day mode or a night mode.

In a day mode, the vehicle detection and measuring module 106 receives an image, creates successive, resolution-reduced, pyramid images, creates raw edge images from the pyramid images, and extracts edge segments from the raw edge images using segment coherence. The vehicle detection and measuring module 106 then removes unnecessary edge segments with thinning, producing a list of remaining thinned segments, and determines a threshold for what pixel gray level may correspond to a shadow for a pyramid level. The vehicle detection and measuring module 106 then locates potential vehicles in each pyramid level, using the thinned segment lists and shadow information, producing the locations of vehicle candidates, and removes any unnecessary vehicle candidates by pruning the unneeded detections found in a frame. The vehicle detection and measuring module 106 considers the persistence of the pruned vehicle candidates, creates vehicle tracks, and determines the range to the tracked vehicles. A track is created by considering the vehicle location history before the track started, and from the vehicle range(s), determines if a warning is needed and whether an event should be logged. The vehicle information may also be distributed to other vehicle systems.

A night mode becomes active when the image gray levels and/or the imager exposure and gain so indicate. When the night mode is activated, the vehicle detection and measuring module 106 receives an image, locates bright areas, and performs couple matching of bright areas, forming taillight pairs. The vehicle detection and measuring module 106 also examines large, wide, unpaired, bright areas (which may correspond to nearby vehicles), and forms virtual pairs when possible. In an example embodiment, the vehicle detection and measuring module 106 considers remaining, single bright areas as motorcycles. The vehicle detection and measuring module 106 tracks pairs of bright areas and single bright areas over time, and using an assumed distance between members of the pairs, and an assumed height for the singles, determines the ranges to the pairs and singles. Based on the ranges, a determination is made whether warnings and/or logging are required.

The vehicle detection and measuring module 106 also includes support functions for both daytime and nighttime modes. These support functions include a camera pitch angle measurement module, a day/night mode module 206 for determining whether day or night operation is needed, a region of interest module 208 for determining when (varying resolution) pyramid levels are used, and range and location signal processing for producing range rate, rejecting outliers, and other aspects of ensuring accurate operation.

The vehicle detection and measuring module 106 captures and receives an image, and using various image processing methods and means described herein, such as region of interest and image gain and exposure settings, determines what kind of image processing to perform on a received image to properly determine vehicle presence and range from one's own vehicle.

A candidate finding module 210 employs a U/H modeling approach in the daytime and a paired/single light modeling approach at nighttime to locate vehicles by applying a pyramid gray level analysis to images. In one embodiment, a determination is made of which approach (day or night) shall be used. This is done by examining the region of interest gray level means, along with the image gain and exposure, as described herein.

Once a day or night modeling approach has been determined, the candidate finding module 210 analyzes images received from an in-vehicle image capturing system. For daytime vehicle images, the candidate finding module 210 may, iterate across possible combinations of vehicle left, bottom, and right edges to determine whether captured images meet a predetermined criteria for being a vehicle. Examples of these criteria are:
  a vehicle is located within an area where lanes or path of travel are/is believed to be;
  a vehicle has a width between that of a bicycle and a large truck;
  the sides are complete enough, being composed of either sufficiently many dark or edge pixels;
  the sides do not have excessive gaps present;
  the gaps near the left and right corners are not excessive (e.g., the left, bottom and right portions of the U/H shape are reasonably connected);
  if a side has dark pixels taken in lieu of an edge, the other side should have edge pixels in the same rows;
  there is sufficient overlap between the sides (dark to edge or edge to edge), in multiple rows.

Nighttime vehicle modeling examines bright areas in an image to identify vehicles. These bright areas may be associated with vehicle lights, or with the illuminated portion of a vehicle if it is close enough. Cars and trucks will typically have a pair of similar lights that define their outer edges, whereas a nearby vehicle will have its width illuminated. Motorcycles and bicycles will have a single or possibly two lights that define their location.

Daytime vehicle modeling determines a vehicle's presence in an image by creating U and H shapes. Vehicles seen from behind during daylight hours have an approximately rectangular shape, with a vertical left edge where the left tire's outer edge is, a horizontal bottom edge where the ground shadow or bumper is, and a vertical right edge where the right tire's outer edge is. These horizontal and vertical edges are generally close to each other, with small gaps where the edges meet. These neighboring horizontal and vertical edges are used to locate vehicles in video images, where they make U or H shapes.

Figure 3:
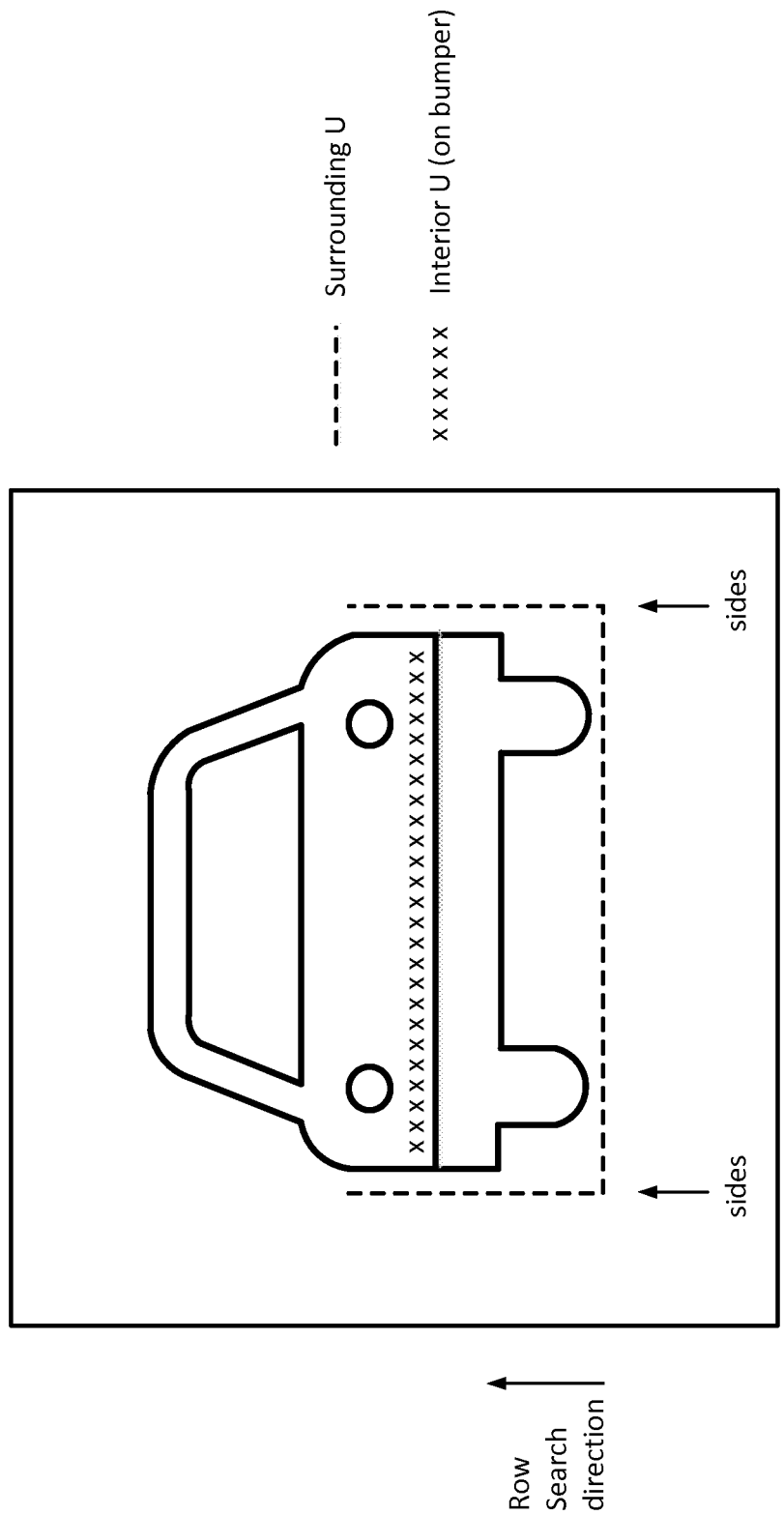
FIG. 3 illustrates an example of how U and H shapes may be formed.
Figure 4:
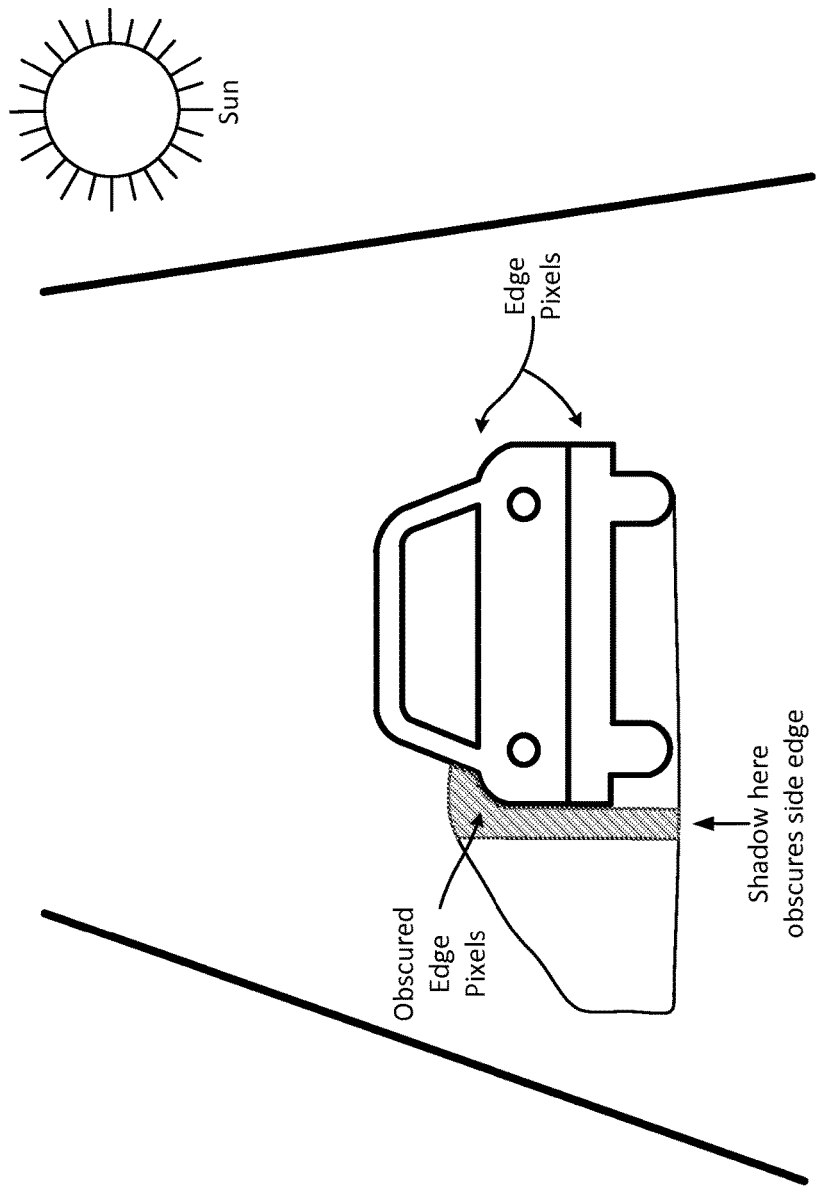
FIG. 4 illustrates an example of a vehicle with an obscured edge.

An example of a vehicle capture is illustrated in FIG. 3. FIG. 3 demonstrates how U and H shapes may be formed. Many factors influence how edges and bottoms are interpreted in image. For example, shadows often obscure the edges (for example, FIG. 4 shows a dark car, seen against a shadow on one side). This obscured edge would normally be visible without the shadow present. Sufficiently dark pixels are therefore allowed as portions of the U/H shape for a vehicle to be properly detected. In FIG. 4 the left edge 402 of the vehicle is not visible, but the dark pixels 404 there complete the U shape. Note that the right—opposite—side, being illuminated by the same light source that creates the shadow on the left, has a visible edge. This edge being present on the opposing side can be a condition when one side is dark and a U shall be constructed.

Figure 5:
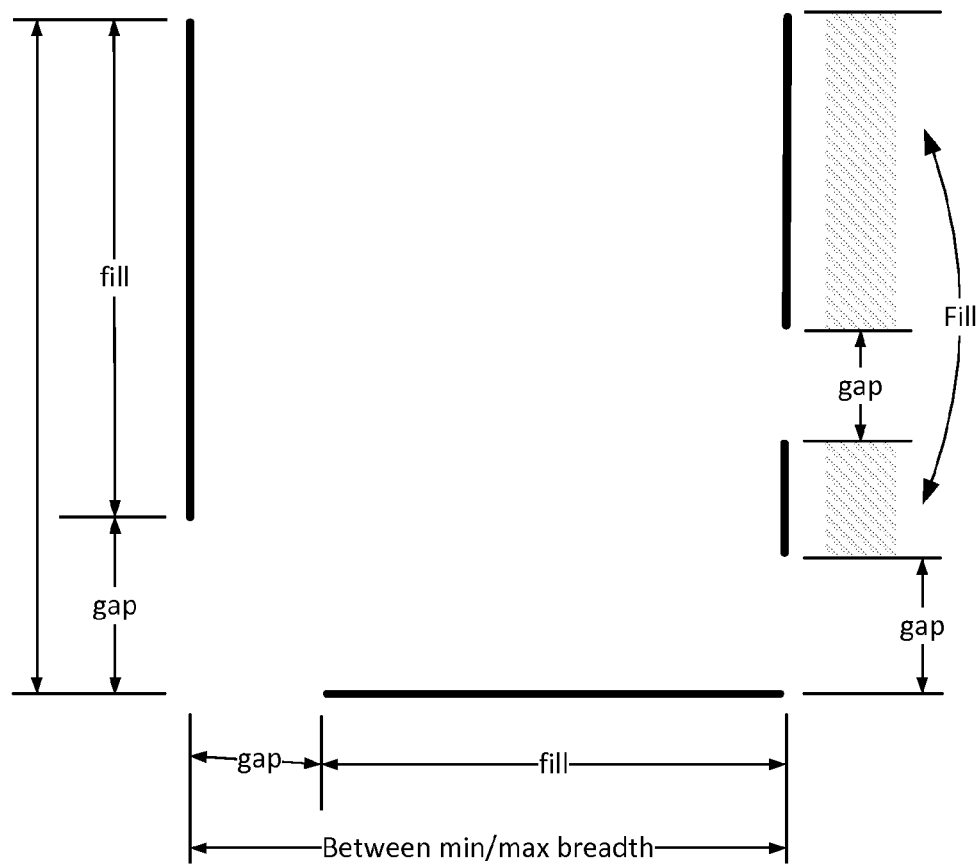
FIG. 5 illustrates an example of a how a U/H shape can be constructed from edges and dark regions, and fill and gap concepts.

FIG. 5 shows how a U/H shape that can be constructed from edges and dark regions, as well as some of the parameters for acceptable U/H shapes. Each side of the U/H shape is described by the number/percentage of edge or dark pixels present, as well as by the maximum missing corner length of not edge or not dark pixels. A low percentage (fill) or high missing length (gap in corner) indicates that a side is not suitable for constructing the U/H shape, as the U/H shape is then not sufficiently complete or connected to the other parts of the U/H shape.

As noted above, vehicle appearance modeling in the daylight hour mode includes a candidate finding module 210 in which the U/H shapes are constructed by combining a left side, a right side, and a bottom and/or bumper segment. The candidate finding module 210 examines possible combinations of left and right, vertical, and sides, and combines these with a horizontal portion connecting the two sides. Fill factors (both edge and dark pixels), gaps, widths (for example vehicles are specified by a minimum and a maximum width), and that a side that has a shadow is opposite a side that has an edge to determine if an acceptable U or H shape can be created.

In an example embodiment, Meter Horizontally in Pixels, or MHP—the number of pixels equivalent to one meter horizontally in a given image row—is used to define how many pixels wide a U must be to be considered a possible vehicle. FIG. 6 is a figure showing an example of a MHP calculation. Vehicles typically are between 1.4 and 2.6 meters wide, and so U's having a spacing between their left and right edges are 1.4*MHP and 2.6*MHP are accepted.

The candidate finding module 210 selects an in image row, and if there are no horizontal lines or dark segments in this row, then the next row is chosen. If there are horizontal lines or dark segments in this row, then these are evaluated sequentially, for example from left to right.

The locations corresponding to a maximum vehicle width before and after, spatially, the ends of a segment are determined. Starting at these locations, a right-going scan for left vertical edges or dark areas is started, and when a left vertical edge is found, then a right-going scan for right vertical edges or dark areas is started, beginning the minimum vehicle width away to the right. If left and/or right vertical edges and/or dark areas are found, the pixels connecting these in the row are examined. The characteristics of the left, bottom and right hand sides are calculated, as is the center location of the possible vehicle, as the midpoint between the left and right sides. The lane corresponding to this midpoint location in the given row is determined.

The candidate finding module 210 then forms a score. If this score is at least as much as the current best score found for this lane (and row), then the current best information is updated (left and right sides, score, U characteristics). When the right edge of the extended horizontal edge or dark segment is reached, then the next edge/segment/dark area, if available, is used for a new left/right vertical sides/dark areas search. When no more edge or dark segments are present in the row, then the next row is examined. As edge segments, sides, and dark areas are found, their characteristics are calculated. If any of these are insufficient to make a satisfactory U/H, then the next segment/side or dark area is examined.

In another embodiment, a scoring function rates the U/H shapes and keeps the strongest ones. An example of the scoring function is:

Score=33*horizontal fill fraction*(horizontal fill fraction with the largest bottom gap considered+ (overlap fraction between left and right sides+ average fill fraction on left and right))

Each of the elements in this equation are fractions, and therefore are independent of vehicle size. Each of the fractions varies between 0 and 1, and so the maximum score is: MaxScore=33*1*(1+(1+1))=99. The scaling factor of 33 in this example is arbitrary.

The minimum possible score is 0. In an example embodiment, an empirically derived threshold of 40 that significantly reduces false detections is employed. The highest scoring U/H shape and its location are stored in memory 212 as processing proceeds, and higher scores can replace it. Other scoring functions also consider fill, gaps, edge polarity, length, gray level, and location function.

The U/H finding process is thus an exhaustive search of the region of interest, which itself is described in greater detail herein. Because many U/H shapes may exist, particularly in complicated, edge rich or dark, scenes, a number of speed up methods are applied.

In an example embodiment, there are several thousand possible left, bottom, and right side combinations that can be tested to find the highest scoring U/H shapes in each lane and row. In order to do this in real-time, the candidate finding module 210 employs an algorithm that rejects a combination as soon as possible. A rejection of a combination may be accomplished by many means. One simple rule for determining whether to reject a combination may be that what is designated as the left side must be to the left of what is designated the right side. Another, slightly more complicated, rule is that the space between the left and right sides must correspond to the widths that vehicles come in.

In an example embodiment, speeding up the search for U/H shapes comes from calculating the best possible score that might be achieved, given what information is already available, and determining whether this can replace the highest score found yet. For instance, suppose that for a given left, right and bottom location the vertical fill (percentage of edge or dark pixels in the meter that is searched upward) on the left side is 0.2, and that the other values are unknown. The maximum possible score is then, assuming best case values for the unknown values is, score=33*1*(1+(0.2+(1+0.2)/2))=33*1.8=59.4

If a U/H shape has already been found with a higher score than this, then further calculations (right hand fill, bottom fill, etc.) do not need to be made, an early exit is possible, and the next left, right, bottom location may be evaluated.

Another simple rule may avoid even this possible score calculation, and reject any left/bottom/right combination with a left or right fill of 0.2 or less. That is, if a left or right side fill of less than 0.2 is detected, do not continue calculation.

Note that a high comparison value (for the best score found so far) is more likely to reject U/H shapes. This can aid in finding a slightly higher best scores quickly.

Another method of speeding up the determination of acceptable U/H shapes comes from reusing what has already been calculated. For example, the fill and gap values of a possible left side are calculated. This possible left side is then combined with all right sides that correspond to real vehicle widths (vehicles are not narrower or wider than some set values). It is not necessary to recalculate the left side values for each U/H when these have already been calculated. It is also not necessary to recalculate the values if the image column used for the left hand side is then taken as a possible right hand side. Only that which is needed is calculated, and that calculation is only done once.

Yet another method uses recursion to speed up the possible score calculation. Suppose, for example, that a U shape which is four pixels wide has three bottom pixels that are edges or dark-enough pixels. The bottom fill of this shape is then ¾. In the next calculation, which will consider a five pixel-wide U shape, one can either have a new (right hand) pixel that is edge/dark, or neither edge nor dark. The horizontal fill will thus be: (3+1/0)/(4+1) or ⅗ or ⅘.

More generally, the horizontal fill can be recursively calculated with one new pixel considered, as: New fill=(old numerator+1/0)/(old denominator+1). Where the choice of +1 or +0 depends on the new, right hand pixel status.

This recursive calculation is applied to get better estimates of the maximum possible score as soon as both the left and right side locations are known. The bottom fill no longer needs to take its best case value of 1, and so the maximum possible is the same or less than what it was when the best case was assumed. The net effect is to favor even more early termination of processing by calculating the left and (recursively, quickly) the bottom fill.

Overall, there are many checks for exiting early or prematurely terminating score calculations in the candidate finding module to speed up the process of determining appropriate U/H shapes. The result is a reduction in processing, with a corresponding speed up.

A candidate score may also be plotted as a function of the left column and the right column locations, with columns being sides of Us or Hs representing vehicle sides. Higher scores are shown with brighter pixels, with darker pixels corresponding to lower scores.

Scores for the detected U or H shapes may have a diagonal structure. The diagonal structure occurs because the image is many vehicles wide, but only the maximum vehicle width is allowed for pairing the left and right hand columns. One is sliding over the image, looking for vehicles of the maximum allowed width, thus linking the left and right columns and producing the diagonal band.

Columns near the left top are in the left portion of the image, and columns in the lower right portion are in the right portion of the image. When multiple lanes are examined, the upper left portion corresponds to the left lane and the lower right corresponds to the right lane. It may be seen that there are possibly vehicles (corresponding to high scores) in the left lane, nothing in the (dark) center, and very likely something in the right lane.

There are brighter vertical and horizontal stripes present in an image. The highest scores (indicated by the brightest points) occur at the intersection of bright horizontal and vertical stripes. These horizontal and vertical stripes correspond to particularly strong (in the sense of high fill and/or low gap) columns in the image, which are likely part(s) of a vehicle(s). As such strong columns are likely to produce a high score, it is beneficial to retain the location of these during calculations and then utilize them first. This is done by starting a normal pairing search for a (single) left and multiple right columns. The left column is held fixed, and all right-side columns corresponding to real vehicle widths are paired with this left side, moving the right column being examined from narrow widths to wide ones. The horizontal bottom connecting these is in a chosen row, and its length is defined by the left and right hand column locations. The fills and gaps corresponding to the (single) left and (multiple) right columns are calculated. Some of these columns may be 'strong', and so likely to produce good scores. It may also be that no columns are strong. The location(s) of the first, strong enough (and so leftmost) column among the right columns scanned, and the (strong enough and) strongest right side column, at least the minimum vehicle width away, are stored. The score is calculated for the stored leftmost (right side) and strongest (right side) columns. Because these columns are both strong, the score is likely to be high. If this score is higher than the best currently found score, then the best currently found score is increased to this new value. This quick increase of the best currently found score makes the best possible score scheme more effective, as mentioned above, as all the ensuing, weaker U/H shapes are quickly rejected without completing the calculations for them.

In an example embodiment, the best currently found score is more rapidly improved by using low values for the minimum column strength required, as even the intersection of weak ridges produces a relatively strong score. The net effect of this directed search and using the best possible score scheme is a reduction in the number of U/Hs formed and tested.

In an example embodiment, the structure of vehicles, with their generally vertical sides, may also be exploited. FIG. 7 demonstrates this concept. For example, suppose that the sides of a vehicle have been found in a given row. The next row to be investigated is over this lower, given, one, and so a good guess for the location of the column sides is the same columns as those from the row below. When no vehicle sides have been found for the row below, then an initial guess of the lane center +/− half the typical vehicle width is made, and the score calculated. These initial guesses and the scores derived from them drive up the highest score found so far quickly, at the beginning of looking in a new row, rendering the best possible score scheme more effective.

An alternative embodiment calculates the column characteristics for a chosen row. These columns are those going from the left extensions of all segments to the segments' right extension. The column characteristics are reordered by descending column fill value. The characteristics of column combinations with proper spacing (between min and max vehicle width) are then calculated (overlap and bottom characteristics between the left and right columns), allowing for early exit. Because the columns are ordered by descending fill, a high score is likely to be generated early and very few calculations will need to be done.

Many additional speedup rules exist, according to different embodiments may also be utilized to increase processing speed. For example:

if the best possible score achievable with what is known so far about a given U is less than the best score found yet, then as a rule, do not continue calculations for this U;

if a row does not contain any edges or possible shadow areas, go to the next row;

if any portion of a row is beyond the lanes, then do not consider or process these portions of the row;

if a right side search is not possible for a left side, then do not process this left side and vice versa;

if a vertical side's fill or gap characteristics are not acceptable, then do not continue processing this side;

if the score produced with the maximum possible bottom fill (known when the left column location is known) is too low, then do not continue processing this U;

if the vehicle center exceeds the rightmost lane mark, then do not continue processing rightward;

if the vehicle center is to the left of the leftmost lane mark, then do not continue processing this U;

if there are no edges on both the left and the right sides, then do not continue processing this U;

if the bottom fill is less than a threshold, then do not continue processing this U;

if both vertical sides only consist of shadows, then do not continue processing this U;

if the largest contiguous gap in the bottom is too large, then do not continue processing this U;

use the strongest columns found during right column searches for a U to increase the best scores;

use the previous row's vehicle edge columns as guesses for the next row's vehicle edges, when available, or else use a standard width vehicle, centered in the lane.

In U/H image processing, false positives are possible. The U/H modeling approach used for finding vehicles in daytime is very general and occasionally finds objects other than vehicles. Therefore, in an example embodiment, the vehicle detection and measuring module 106 includes a pruning module 214 for detecting and rejecting false positives.

The methods employed by pruning module 214 to reject false positives may be divided into classes. These classes look inside the U/H, look outside the U/H, and exploit transparency. An example of the first such class (or, a look inside the U/H) is the requirement that vehicles have tires. These are generally located near the (lower) left and right corners of the U/H, and are dark. Thus one necessary condition for a proper detection is that dark pixels be located near the bottom corners. Dark is defined in relation to the shadow gray level (tires are normally darker than the shadows).

An example of the second such class (or, a look outside the U/H) is the limited length of vehicle edges. These may not be persistently arbitrarily long, and may, in particular, not extend both to the left and right, or above and below, the U/H shape found. They may not extend to both sides horizontally, as shadows occur to one side only (a transitory overlap between an edge not produced by the vehicle and the vehicle bottom may occur, but this does generally not persist).

Vehicles also have a limited height, and thus the vertical edges associated with them are also limited in length. Shadows behind the vehicle may lengthen this edge, but they cannot extend above some maximum height over the ground plane. A transitory overlap between an edge not produced by the vehicle and the vehicle side(s) may occur, but this again does generally not persist.

An example of the third class (exploiting transparency) is recognizing what is within the U, such as lane markings. If a separate, lane marking recognizer identifies a sufficient length of lane markings within the U/H, then the purported vehicle defined by the U/H is transparent, and hence it cannot be a true target.

Further false positive rejection methods are contemplated, and include: rejecting textured (measured as high edge content) green areas (these are vegetation), areas with insufficient numbers of dark pixels below, and areas with too many corners (defined as 3 pixels of a 2 by 2 pixel region all being lighter or darker than the fourth).

Figure 8:
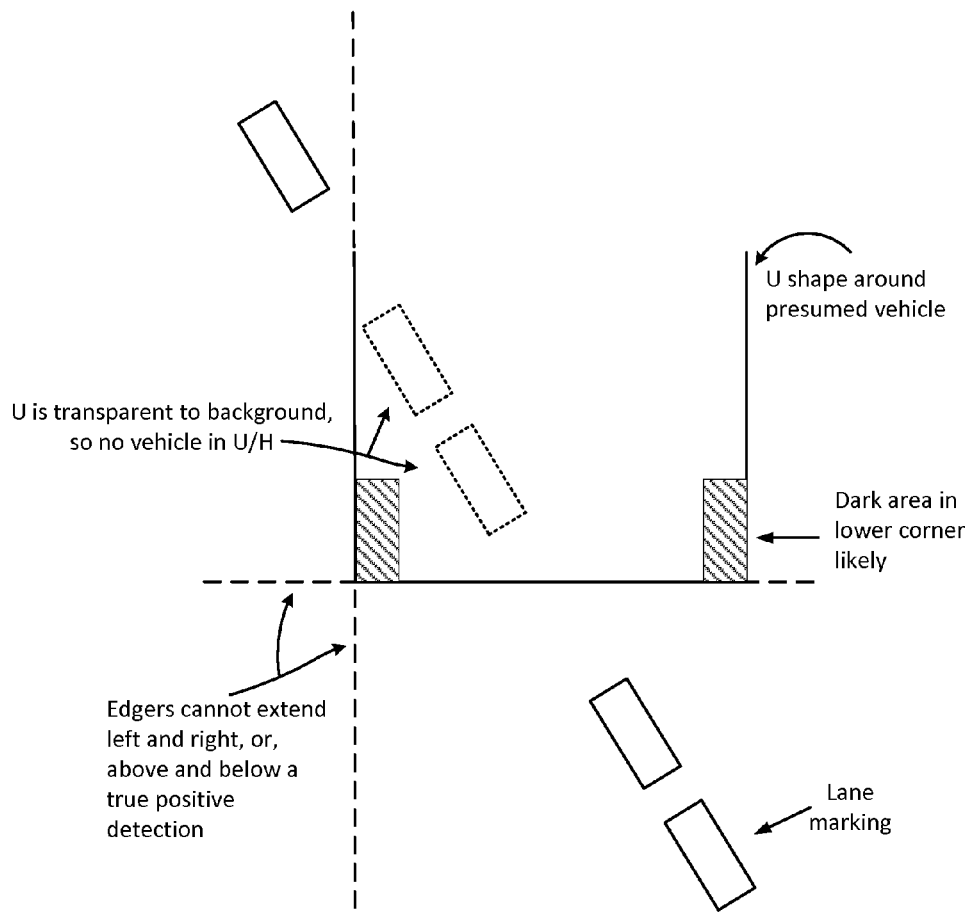
FIG. 8 illustrates an example of a method for rejecting false positives.

As one skilled in the art can readily appreciate, the additional computational load of the aforementioned methods is not large, as only a few pixels must be found for the first class, segment length is known entering for the second class, and compact lane marking location information is available for the third class. FIG. 8 shows an example of some of these various methods of rejecting false positives.

Because vehicles generally have bumpers, a bumper may be confused with the true bottom. In an example embodiment, a bottom-bumper module 216 is employed to distinguish between the bumper and the true bottom of a vehicle. The true bottom is defined as the location where the tires contact the road. When this confusion occurs, a U is placed higher in the image than it should be, creating an H shape. A bottom/bumper portion of the vehicle model learns the spacing between the bottom and the bumper, solving the confusion, and calculating where the bottom would be even if the bumper is found.

Figure 9:
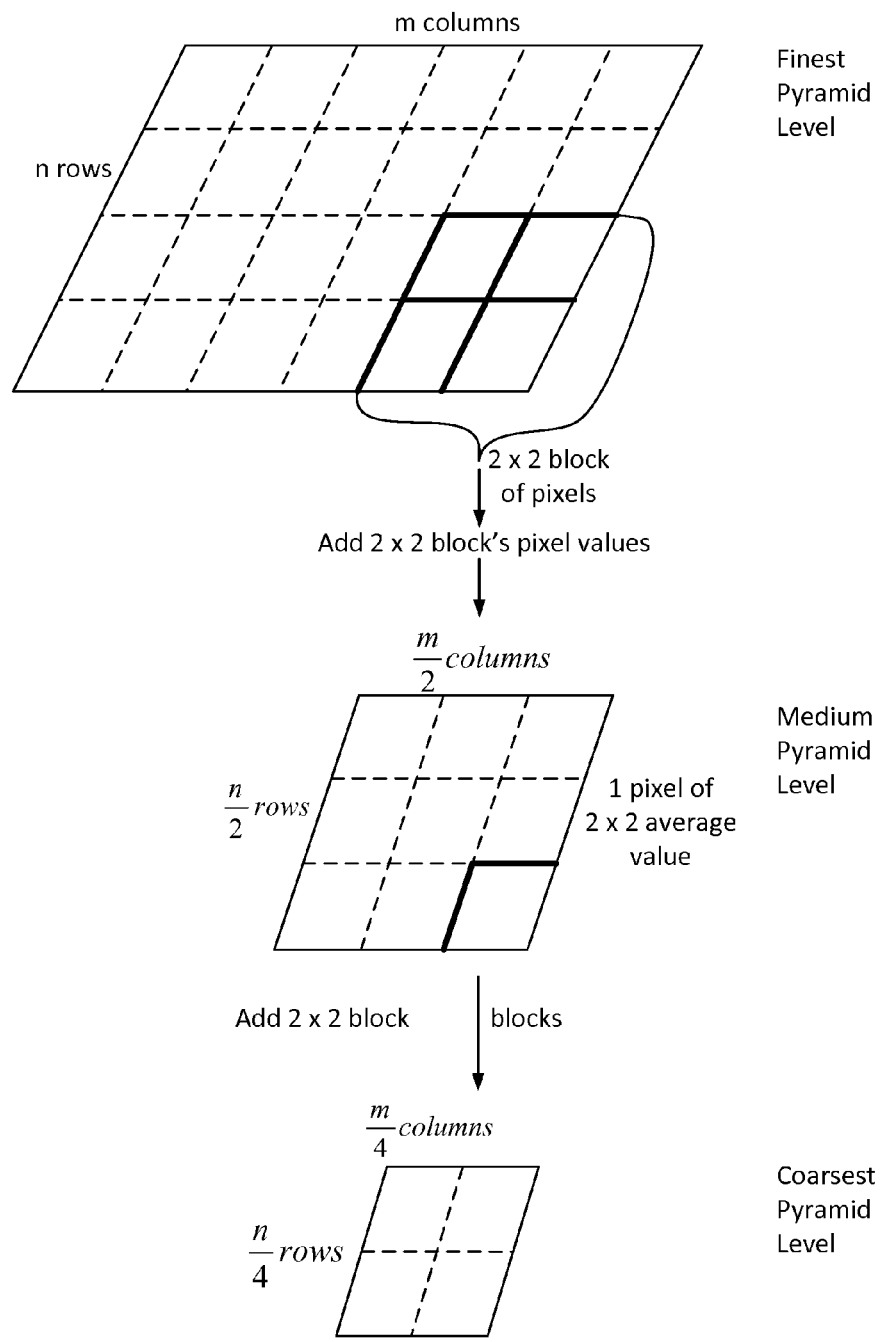
FIG. 9 illustrates an example of a pyramid-type image processing scheme for maintaining more constant calculation times.
Figure 10:
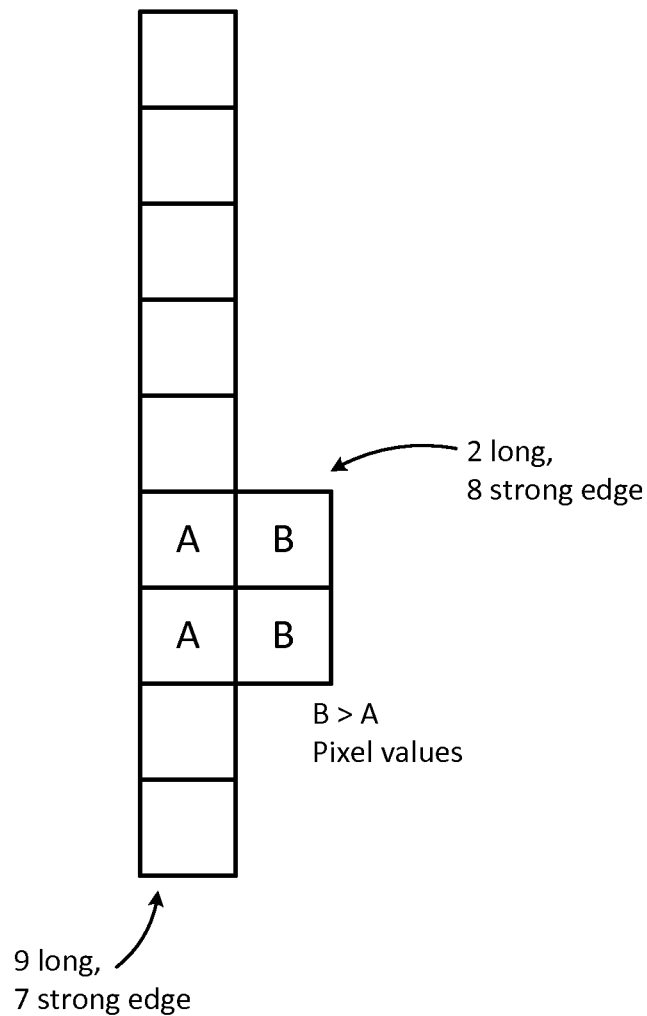
FIG. 10 illustrates an example of edge thinning.

As mentioned above, a pyramid-type image processing scheme can be used to categorize U/H shapes using pixel blocks to identify multiple levels. Vehicles vary in both size and the range to them. For example, a small car 100 meters away may have a width of 5 pixels in the image, whereas a truck nearby can have a width of 200 pixels. The area that each covers is typically the width squared, and so can vary between 25 and 40,000 pixels. Because of this large variation, and the ensuing large computation times for processing so many pixels, in an example embodiment a pyramid resolution scheme is employed. This scheme takes 2×2 groups of pixels and averages them, producing a coarser, new image with half the rows and half the columns of the original. Closer vehicles, which would normally occupy many pixels in the normal image, cover correspondingly fewer in the coarser levels. Because the vehicles are closer, the vehicles are visible to approximately the same level of detail as those further away. FIG. 9 is a chart showing an example of this concept. All levels are then fed to an edge extraction scheme that will be described in further detail herein infra.

In an example embodiment, a centered-difference or Sobel edge extraction algorithm may be performed on pyramid levels, resulting is a gradient magnitude image, for the pyramid levels. A stronger magnitude indicates a stronger edge. The candidate finding module 210 can link together weak, but still strong enough, edge pixels by considering their neighbors.

In a further aspect of this technique, U and H shapes begin to be formed by linking edges together. Gradient magnitude images are normally thresholded to locate the significant edges in them. These thresholded images may then be further processed to join separate segments that, e.g. have a second weak, but still important enough, gradient magnitude pixel(s) between them. The result is an edge image, thresholded with a particular level, with weak gaps closed and/or ends added. The two thresholds are chosen to reduce noise.

Another scheme may also be used, where it is known that vehicle boundaries usually consist of horizontal and vertical segments. An edge model, consisting of weak, but contiguously located, gradients can result in sufficiently long edges. For example, the minimum length can be given by the sizes of vehicles, with vertical lengths of greater than 0.2 meters required for motorcycles and 0.1 meters for bicycles, and horizontal lengths of 1.0 or more meters required for cars, trucks, and other four-wheeled objects. No additional gap closing or end adding may be required.

The result is a list of vertical and horizontal edge segments. The gradients at non-edge locations no longer need to be re-examined later, as the list now comprises pixel locations with edges present, without including non-edge locations. This compression into a list, without any non-edge segments, increases the computational speed later, when the edges are combined to form U or H shapes.

Image processing according to an example embodiment may further include an edge thinning technique. The edge segments produced by the coherence-based method are often touching each other, but with different lengths or strengths. The shorter or weaker of these segments can be removed, or thinned, thus increasing speed without losing detections.

Edge thinning examines neighboring rows and columns of edges that have a length, a gradient magnitude, and/or strength. When edges in two different rows/columns touch, then the decision is made which portions of these to remove. FIG. 9 illustrates an example of edge thinning according to an example embodiment.

Figure 11:
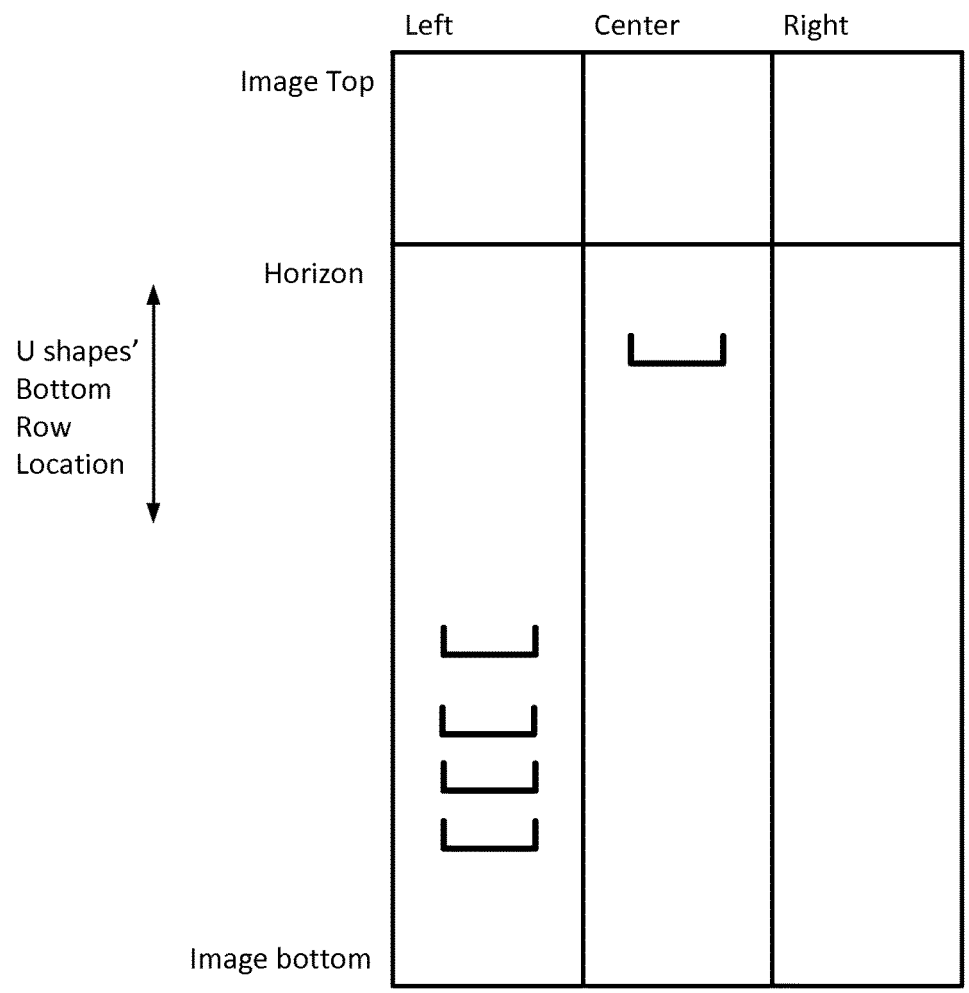
FIG. 11 illustrates an example of U/H shapes for a plurality of lanes stored and ordered by image row.

In an example embodiment, the strongest U/H shapes in each lane are stored and ordered by image row. The result is a collection of detections, an example of which is shown in FIG. 11. In FIG. 11, multiple U-shapes are detected in the left lane, nearby (near the bottom of the image) and just over each other. There is a single, distant detection in the center lane, relatively close to the horizon, and no vehicles are detected in the right lane.

The bottom row location of the U-shapes is also stored. This collection is forwarded to the pruning module 214, which removes unnecessary detections (such as those over the bottommost detection in the left lane in the example above).

Figure 12:
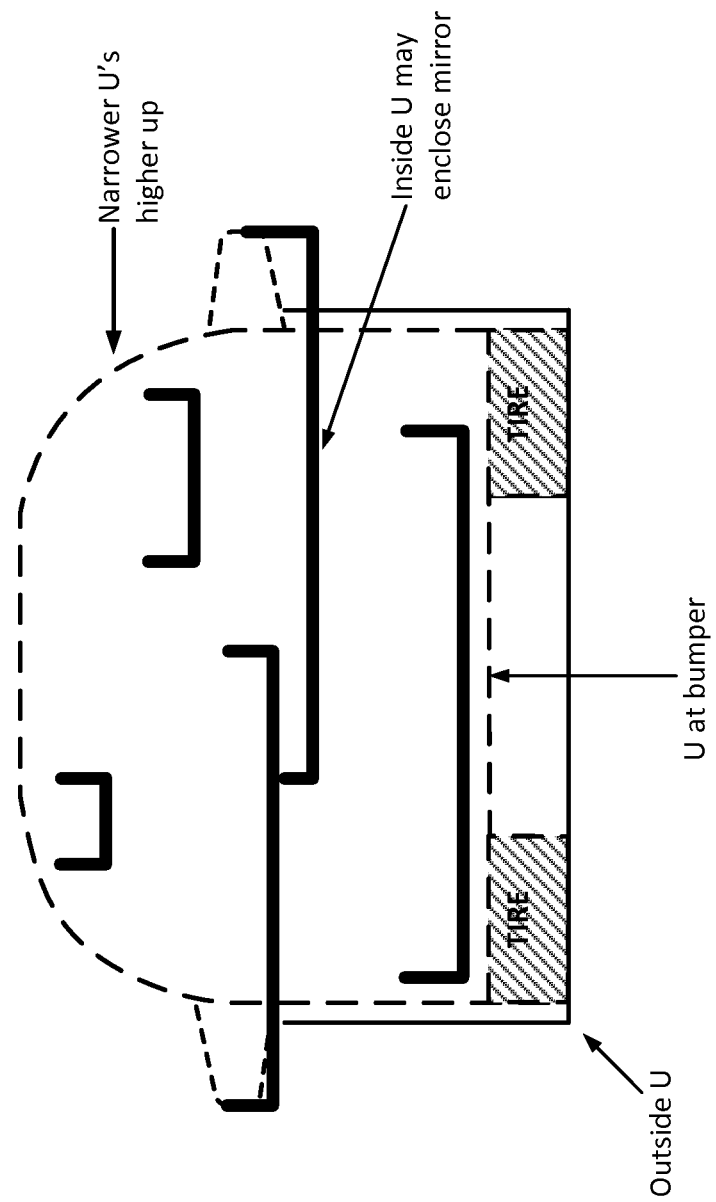
FIG. 12 illustrates an example of U/H shapes surrounding and contained within the back of a vehicle.

A U/H detection algorithm may find many U/H shapes surrounding (or within) the back of a vehicle. Of interest is the portion of the U shape touching the ground. The U/H shapes above this can be pruned away without losing information about the target by the pruning module 214. FIG. 12 illustrates an example of U/H shapes surrounding the back of a vehicle.

The pruning module 214 receives all portions of the U/H shapes generated by the candidate finder and removes unnecessary ones. When many candidates are found for a vehicle during the search for acceptable U/H shapes, some of these candidates can be eliminated. For example, shapes that have the same left and right (side) locations, whereas one bottom is just above the other, can be eliminated because the bottom is above the other, U is further away, and thus not needed for the distance measurement. Removing unneeded candidates makes the ensuing tracking clearer and less computationally expensive. The pruning module 214 can apply multiple rules to accomplish removal of unneeded candidates In an example embodiment, the rules for pruning module 214 to remove a U/H shape includes but is not limited to any one or combination of the following:

If a U/H shape A has no lower, at least as wide, neighbor (in the image), then keep it;
    if a U/H shape B has a lower, at least as wide, neighbor, then discard it;
    If a U/H shape C has a lower neighbor D, but it extends further to the left or right, then keep shape C and discard U/H shape D;

If a U/H shape E has a different bottom edge polarity (transition from light to dark or dark to light) than a lower neighbor F, then keep both U/H shapes E and F.

Figure 13:
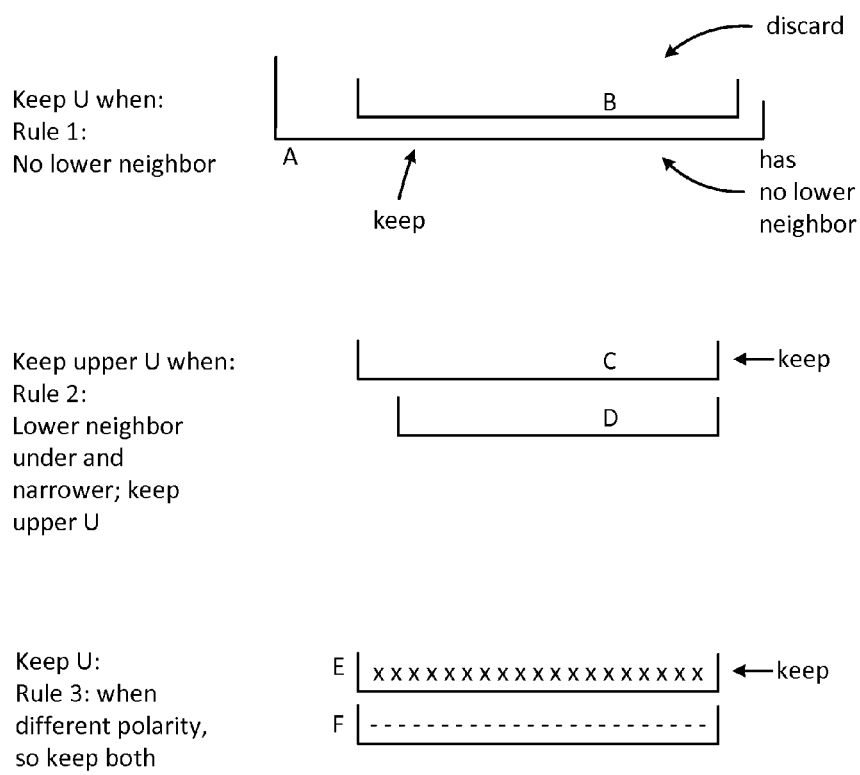
FIG. 13 illustrates an example of rules for keeping U's by a pruning module.

Other rules for removing a U/H candidate in addition to those above may also be applied. For example, a candidate above a U/H that is lower in the image, but with the same sides can be removed, and a candidate above a U/H in the image, but contained with the sides of the lower U may be removed. The pruned target list is then sent to the tracking module 202. FIG. 13 illustrates an example of rules for keeping U's by the pruning module 214.

In addition to applying various rules for removing a U/H candidate, the pruning module 214 may apply various rules for retaining a U/H candidate. Examples include retaining a candidate where there is no lower U with the same left and right locations, where the lower U, in spite of having possibly exactly the same left and right sides, is of a different polarity (see FIG. 13 herein), and where a U that is higher, in spite of overlapping with a lower one, has a left or right side that is wider.

The polarity of an edge is positive or negative, depending on whether it is a transition for dark to light (+) or from light to dark (−). When edges are of different polarity, they do not come from the same, possibly uncertain location, source, and thus, in an example embodiment, are retained.

In an example embodiment, the candidate U/H pruning process employed by pruning module 214 removes many (50% or more) unnecessary U/H shapes. Many candidate U-shape detections may occur at each frame, coming from multiple pyramid levels. These are thinned by the pruning module 214, but many may still remain. The remaining U shapes are collected within a data structure. These are sent to the tracking module 202 to analyze areas of motion.

The thinned locations of the detections may be plotted over time by placing the location of the bottom(s) on the vertical axis, and time on the horizontal axis by tracking module 202. This plot type permits detecting trends. An example of a plot of vertical locations of the bottom of an image of U/H detections after pruning, over time is illustrated in FIG. 14.

Figure 14:
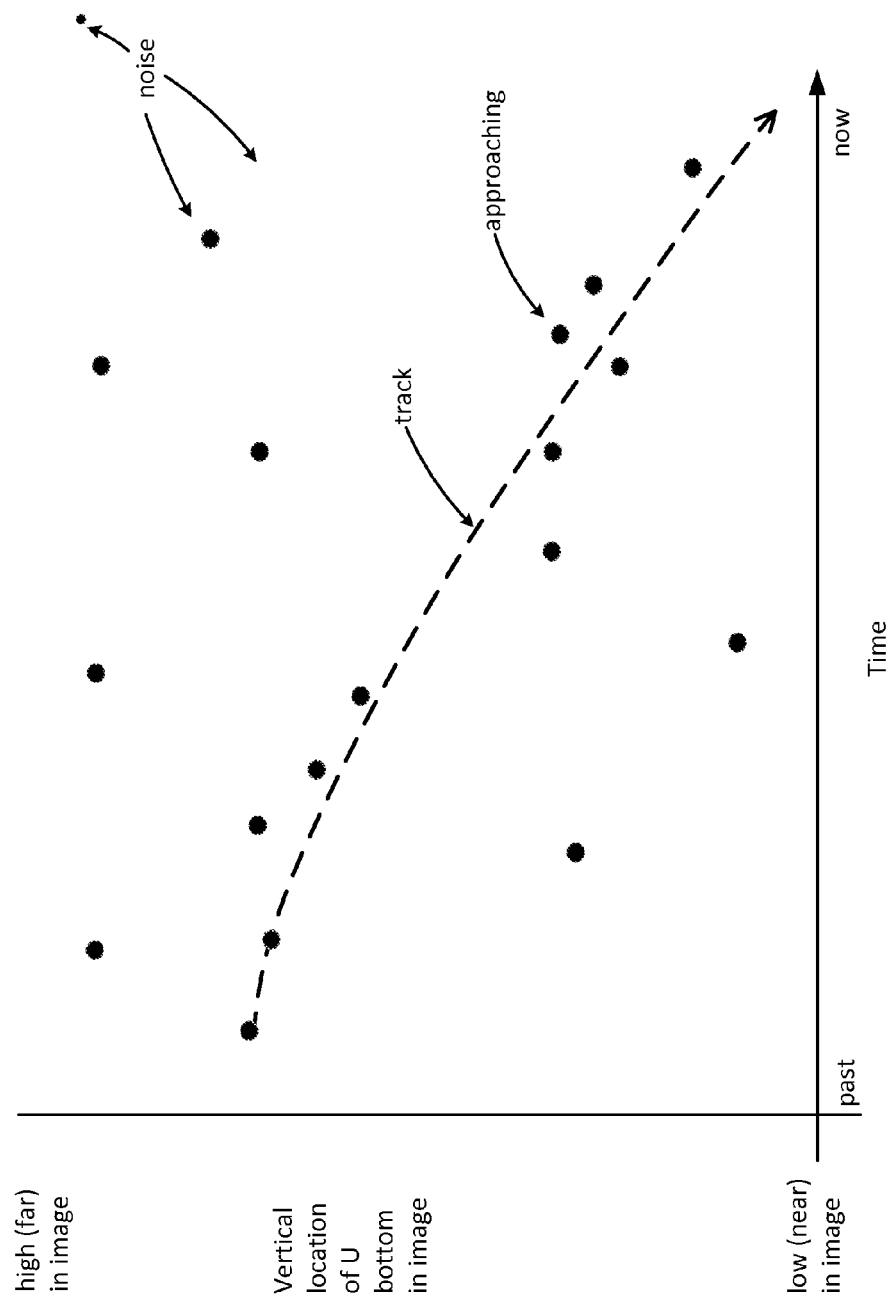
FIG. 14 illustrates an example of a plot of vertical locations of the bottom of an image of U/H detections after pruning, over time.

The horizontal direction in FIG. 14 corresponds to time, with older detections being more to the left, and newer more to the right. The vertical direction in this figure corresponds to the bottom row location in the image, with higher detections corresponding to a target vehicle that is further away, and lower detections corresponding to a target that is close. The correlation of close having a low position in the image and far away being positioned further up is also indicated in the figure. It may be seen that a vehicle candidate is getting nearer, being first at a middle distance in the past, and at a closer distance in the present. This (thinned) row detection collection, accumulated over time, forms the input to the tracking module.

The tracking module 202 assembles tracks (areas of presumed object motion) from the row detection collection. In an example embodiment, a history of detected target Us is organized by pyramid level, lane, vehicle style (for example, 2-wheeled or 4-wheeled vehicles, one with narrow U shapes and the other wide U shapes), bottom edge row location, and bottom edge polarity (light over dark or dark over light). Within each pyramid level, within each lane, and for each vehicle style, the history is searched for peaks, so that any rows in this lane which are within or near a current target track are ignored. This aspect of the tracking module can help avoid starting a redundant track.

A peak is defined as a group of contiguous rows in which the sum of the bottom edges of both polarities is greater than a threshold that may be fixed or variable. In another example embodiment, peaks may be defined separately for each polarity. Regardless, when a peak is found, a new track is started at that location.

When a new track is started, the tracking module 202 performs several steps. From the rows within the found peak, the tracking module 202 finds the row(s) with the highest count in either polarity. These rows will be identified as the bottom, unless switched later. The bottom is then refined—within the detection history for this polarity, the module finds the local peak(s) that is or are at most +/−0.5 meter apart, and converted to rows from the found bottom row. Within these rows, from the oldest frame to the newest frame, the tracking module 202 finds the detected row that is nearest the own vehicle. The tacking module 202 filters these detections with an Infinite Impulse Response (IIR) filter. Within the local peak used above, the tracking module 202 zeroes the detection history so that it won't interfere with the bumper finding process.

If this target is a 4-wheeled vehicle, the tracking module 202 looks for a bumper signature. Within an area that is +/−0.5 meter away converted to rows from the found bottom row, within each polarity separately, the module finds the row that contains the most detections. It then refines the bumper in the same manner as the bottom. If the found bumper row is nearer the vehicle than the found bottom row, it swaps the bottom and bumper.

In a subsequent frame, the tracking module 202 searches for targets found in the same lane as the track with the same vehicle style having a bottom row within a local area around the current track bottom and having a bottom edge of the same polarity as the track bottom. It then computes a match score based on left, right and bottom errors (differences) from the current target left, right, and bottom, and saves the best bottom match target. If this track is a 4-wheeled vehicle, repeat the above steps to find a target bumper match.

To update tracks, if no potential target matches were found in this frame, the tracking module 202 uses the predicted (filtered) information. If a potential bottom and/or bumper match were found, it computes the potential error from each of these to the track left edge. The module will use the detection that is within an allowed error range and with the smaller error and reset the left edge out counter. If none, then it uses the predicted left position and increment the left edge out counter. The module repeats the above step to update the track right edge, using the appropriate (right edge out counter.

In an example embodiment, the tracking module 202 also computes the width between the updated left and right edges. If this width is within an allowed minimum and maximum for the track type, use it to update the track width and reset the width out gate counter. If not, the module uses the predicted width and increment the width out gate counter. If a potential bottom match was found, the module computes the error to the track bottom edge. If is within an allowed error range, it uses this bottom position and resets the bottom edge out counter. If the track is not confirmed and the found bottom is more than 0.25 m from the predicted bottom, it resets the bottom and restarts the filters. If the found bottom is not within the allowed error range, it uses the predicted bottom position and increments the bottom edge out counter.

If a track is a 4-wheeled track and a potential bumper match was found, the tracking module 202 computes the error to the track bumper edge. If is within an allowed error range, the tracking module 202 uses this bumper position and resets the bumper edge out counter. If the found bumper is not within the allowed error range and the track bottom position is more current than the track bumper position, the tracking module 202 uses the track bottom and the track bumper height to predict the track bumper position and increments the bumper edge out counter. If not, the tracking module 202 uses the predicted bumper position and increments the bumper edge out counter.

If both the bottom and bumper were matched in this frame, the tracking module 202 uses them to update the track bumper height and filters the track left, right, bottom, bumper and width. The track range can then be updated, by a computation using the current bottom position and the flat road model. If this range is within an allowed error range from the current or predicted track range, the module uses it to update the range and reset the range out gate counter to zero, just like the resetting of the counters above). If not, it calculates a track range using a learned constant that relates the width in pixels of a target in the image to its range in meters) and the current track width. If this range is within an allowed error range from the current track range, the module uses it to update the range and reset the range out gate counter (to zero). If neither of the above, the predicted range is used and the module increments the range out gate counter.

Filtering the track range to produce a smoothed and predicted range involves calculating the track range rate using the frame-to-frame difference of the track range. If the range rate exceeds an allowed maximum, use the predicted range rate. The distance between the tracked vehicle center and the center of its lane of travel is computed, as is the distance between the tracked vehicle center and the vehicle center. The tracking module 202 then updates the track lane assignment and the track confidence.

The tracking module 202 may also investigate whether to keep a track or drop it. Rules may be used to drop a track, for example, if not confirmed within an allowed number of frames, or if the track vehicle has been straddling a lane boundary for more than an allowed number of frames, or if two tracks are within the same lane and are both confirmed and are both mature. If they are neighbors, the rules may remove the one whose center is nearer the lane boundary. If they are intersecting or nested, the tracking module 202 may remove the track that has been straddling a lane boundary for more frames. If neither, the module may remove the track that is at a farther range, or remove the track that is younger. A counter may be used to assist with determining how much time a track has existed.

The tracking module 202 employ a variety of filtering concepts. Such concepts include getting a measurement, smoothing it to combine it with previous values with the purpose of reducing noise, and predicting what the next measurement will be, using previous values. Other filtering concepts may also be utilized, such as: if at any time as measurement is missing, it is replaced with the predicted value to feed the filter; keep track of how many consecutive times the filter has had to be given the prediction (the larger the number of times, the less sure the module can be of the filter's outputs), and if the number of consecutive times reaches some preset limit, the module has been predicting too long and the filter is stopped, terminating the track. In another filtering concept, because measurements can be noisy, it is possible that multiple measurements could be the correct input(s) to a filter. In order to eliminate the one(s) that are not correct inputs, another concept may define a region of acceptance (a gate) for what values are allowed. This gate is typically placed symmetrically around the predicted value.

Yet another concept combines several of aforementioned concepts. As the tracking module 202 predicts for a longer time, the tracking module 202 becomes more uncertain what the true outputs of the filter should be. Because of this increasing uncertainty, the module may increase the gate size discussed above with time. Conversely, when there are few or no missing measurements, it becomes more certain of what the filter outputs shall be, and so decreases the gate size. When the filter is started, there is no gate applied, as no predicted value is available yet.

To summarize, the tracking module 202 receives the thinned candidate U shapes that are associated with vehicles. The tracking module 202 assembles the persistent candidates into tracks. If a track is persistent and consistent enough, then the measurement process—left, bottom, right, width and range, is started. The smoothed, differentiated range produces the range rate.

In the night mode, targets are found by using their lights, located as bright spots in the image. These lights usually come in pairs for wide vehicles, and as singles for narrow vehicles. Characteristics of the lights and of the light pairs are used to identify them as belonging to vehicles.

An example embodiment utilizes several characteristics of vehicle lights as assumptions to analyze potential candidates. Vehicle lights generally come in pairs, in about the same image row, and when in pairs, are typically separated by approximately 2 meters. They also come in similar sizes, and in mirrored shapes, on the left and right. Vehicle lights also have shape bounds (limited aspect ratios), and come in typical sizes, with a given spacing between them so that size bounds can be calculated. Vehicle lights also become dimmer with increasing range. An example embodiment assumes that vehicle lights are located between 0.3 and 1.7 meters over the ground when pairs, and approximately 60 cm over the ground when they are singles. These characteristics are exploited to identify, pair and track lights over time, finally producing the range.

In addition to determining whether a vehicle is present in an area in front of a vehicle, an example embodiment also determines a range to that vehicle by estimating distance. Different methods of determining the range may be used depending on different conditions, such as whether it is day or night.

Figure 15A:
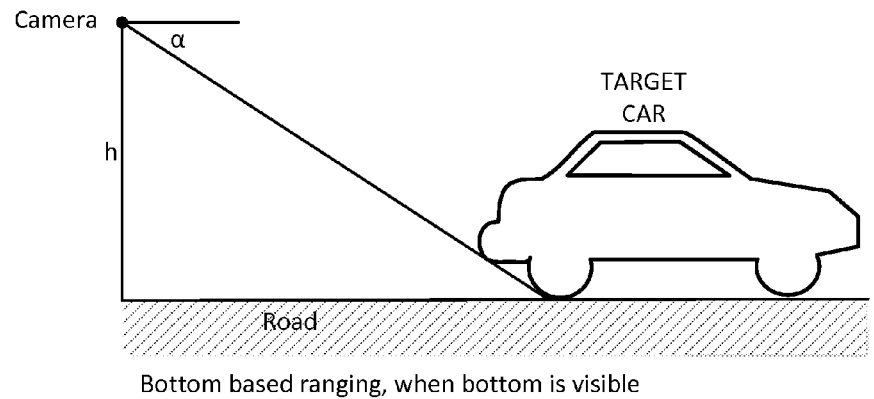
FIG. 15 illustrates examples of determining the range to a vehicle during the daytime.

In an example embodiment, the range to a vehicle seen ahead can be estimated in daytime by assuming, that the road between the camera in an own vehicle and the vehicle observed is flat. FIG. 15A illustrates an example of a daytime flat road model and ranging equation. The height of the camera is known, and the angle between the lower edge of the vehicle and horizontal can be determined from the image and the current pitch angle as described herein. A trigonometric relation can then be performed to give the range to the vehicle. This method has a potential of range uncertainty with increasing distance, as each vertical pixel covers more distance on the ground with increasing range.

Figure 15B:
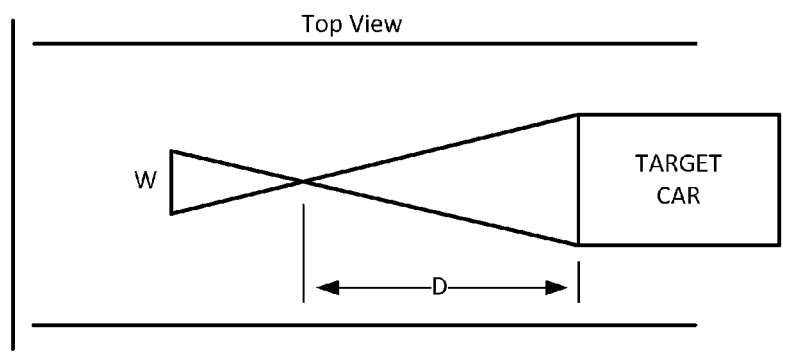

In a second example embodiment, the width (or more generally, the distance between any two points) of a vehicle is related to the range. The relation between the width and range is an inverse one, with Range=constant/width. The constant is learned by accumulating range (using, for example, the flat road method above) and width measurements, and then averaging, calculating the median, or otherwise filtering, the constant. When a flat road-based lane measurement is not available (the vehicle bottom may perhaps not be visible, or sudden camera pitching may cause an implausible range as derived from the flat road model), then the width-based range can substitute, using the equation above. When a plausible flat-road-based range is available, then the physical width of the vehicle can be estimated. This physical width estimate improves with increasing time, as more measurements are accumulated. Fixed points within the vehicle can also be used to estimate the range. An example of this ranging method is illustrated in FIG. 15B.

Nighttime distance estimation may also use different methods. For example, one such method assumes a distance between a pair of taillights (found as bright areas in the image), or an assumed height over ground. Most vehicles have a taillight separation of between 1.5 to 2.5 meters. A 2.0 meter separation may be taken as typical. The distance to the vehicle ahead is then given by:

$$\text{Distance} = 2.0 * \text{focal length of lens/physical separation between taillights in the image}$$

The physical separation is measured as the horizontal pixel size times the difference between the column locations of the bright spots.

Figure 16A:
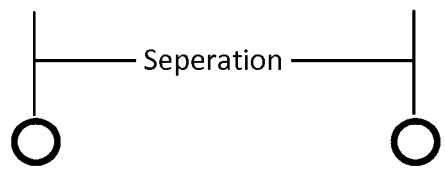
FIG. 16 illustrates examples of methods for determining the range to a vehicle at nighttime.
Figure 16B:
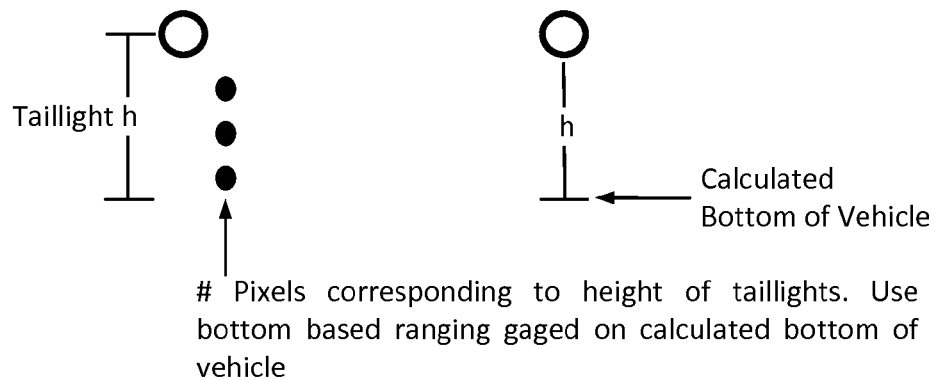

An example of a second nighttime method assumes a height over the ground plane for a bright spot. As noted above, lights typically have, and an example embodiment assumes, heights over the ground plane of between 0.3 and 1.7 meters. The number of pixels equivalent to 0.3-1.7 meters is used to estimate the bottom location of the vehicle. From this bottom location, the flat road assumption can again be used to estimate the distance to the vehicle. FIG. 16 illustrates examples of both of these nighttime ranging methods.

An example embodiment also includes a region of interest module 208 that identifies of region of interest in front of a vehicle for image processing. An image is divided into different coarseness levels by the pyramid scheme described above. The finest level is used to detect the most distant vehicles, the medium coarseness level is used to detect medium distance vehicles, and the coarsest level is used to detect the closest vehicles. The coarser the level is (or, the poorer the resolution is), the poorer the distance resolution is to the vehicle ahead. However, as shown above, since the nearby resolution is good to begin with, and an approximately constant distance resolution may be maintained.

Determining where the boundaries between the most distant, the medium distant and the nearby vehicles lie is done by requiring that the distance resolution not become excessively poor in any level (e.g., with a large uncertainty in distance). Starting with the coarsest level, region of interest module 208 determines the road plane distance between pixels in neighboring rows. When it reaches, for example, 3 meters, region of interest module 208 defines this row as the top of the coarsest level. The next, less coarse, level is now analyzed, using this as its bottom row, and initially with a smaller pixel footprint. As it moves up to this less coarse level, the pixel footprint increases again. When it also reaches 3 meters (for example), the finest level starts. The result is three (or more, where there are more pyramid levels) range sets.

In order to avoid sudden changes in range resolution, the levels are overlapped. This also improves the chances of detecting a vehicle should one not be found in one of the levels. Region of interest module 208 also determines a lateral placement of the region of interest. The lateral placement may be done with a yaw rate sensor, another image-based sensor such as a lane departure warning, or other systems such as a global positioning system (GPS).

In an example embodiment, a region of interest in a forward collision warning system is generated for rows corresponding to range 6 m-150 m. Curvature for the region of interest is derived either from Lane Departure Warning (LDW) curvature or instantaneous yaw rate (filtered) from the yaw rate sensor. An LDW curvature module 218 may also be included to compute a quality measure which varies between 0-1 to help discern how reliable the curvature value is If the Curvature Quality>Threshold (0.5) then the region of interest module uses the LDW curvature for generating the region of interest, else it uses the yaw rate value. If using yaw rate then region of interest curvature is computed as:

$$\text{ROI\_Curvature} = (\text{Yaw Rate (rad/s)}/\text{Vehicle Speed (m/s)}) * (4/Pi).$$

In an example embodiment, the ROI curvature is filtered using an IIR filter with a ~63% rise time of ~0.3 seconds when using yaw rate value and an IIR filter with a rise time of ~0.6 seconds when using LDW curvature. The different IIR filters are used to handle the difference in noise characteristics between yaw rate and LDW curvature.

If using the LDW curvature module, then up to 6 LDW detections (if available) may be used, ranging between 6 m-30 m, for generating the region of interest. These detections are also adjusted for camera pitch variations (if any). If these LDW points are available then the module interpolates linearly between these detections in the image plane for both left and right sides up to the furthest available LDW detection and then uses the region of interest curvature value to compute the remaining points up to 150 m.

If using yaw rate then the module uses LDW's best guess for the closest points (left and right sides) to the camera and then uses the region of interest curvature value for the remaining points. From the row corresponding to furthest LDW detection point to the row corresponding to 150 m, the module traces the points on the circle whose curvature is equal to the region of interest curvature in the road plane and maps these coordinates to the image plane (left and right sides).

Therefore, after computing the coordinates of the center lane of the region of interest in image space, the extremities of the adjacent lanes are computed by adding and subtracting the width of the center lane in a given row for the right and left lanes respectively.

An example embodiment provides an accurate pitch angle for an accurate road plane distance measurement. Pitch varies with a variety of factors such as road irregularities, vehicle speed and speed changes, and vehicle loading. Three sources of data are used to determine pitch: lane markings extrapolated to provide a vanishing point; an on-board accelerometer; and the vehicle's speed. The on-board accelerometer is used to provide pitch measurements when no lane markings are visible, and the vehicle speed provides an acceleration-dependent pitch change. Accelerating vehicles pitch upward, and decelerating vehicles pitch downward, with the dependence that can be modeled linearly:

$$\text{Camera pitch} = \text{static camera pitch} + (\text{constant}) * \text{vehicle acceleration}.$$

The constant used in the above equation depends on the type of vehicle to provide a more accurate pitch measurement. Vehicles with stiffer suspensions will have a smaller constant value, while softer suspensions, such as those found in trucks, will have a larger constant. The constant can be found by experimental measurement or derived from the vehicle type/suspension characteristics. An arbitration mechanism may be employed to determine which measurement (source) shall be used.

An example embodiment also accounts for shadows and other obstructions. Vehicles, buildings, weather conditions, etc. may cast or cause shadows, leading to obscuration of the vehicle edges, depending on the geometry. Because of the obscuration of the edges, which would cause a finder (e.g., candidate finding module 210) in the U/H model to not find vehicles were it only based on edges, one must also allow dark pixels to function as edges. The determination of what gray level is sufficiently dark is done by examining the statistics of the image or portions of the image in the region of interest, described further herein, found in the different pyramid levels. A typical gray level for shadows is between 60 and 100 in an 8-bit gray level image.

An example embodiment includes a warning module 220 for warning drivers and a logging module 222 for logging data for later retrieval in accident or incident investigation. Often, different distance-based events occur during driving. These include tailgating (which is driving too close for a given speed, which would trigger a forward distance or collision warning) or approaching the target too rapidly for a given distance (producing a too small time to collision, or TTC).

The range is present in calculations for both FDW and TTC, and the range rate is present in the TTC calculation. Therefore, the range signal should be reliable and smooth to avoid unnecessary warnings. Range may be derived from both the flat road model and the vehicle width models discussed. That range (flat road or width-based) is chosen based on a range value which is closer to a predicted value at each frame. If neither is close enough to the predicted value, an extrapolation is made.

In an example embodiment, the idea of 'close enough to the prediction' is expressed with a gate. This gate is a region, around the predicted value, within which certain measurements are acceptable. The size of the gate is determined by calculations. Note that the gate size increases with range, as range uncertainty increases with increasing distance.

The left, bottom, and right sides, as well as the width, are tracked with similar mechanisms, and each has an associated gate. Each tracking mechanism is capable of predicting which measurement should occur at the next frame. When too many predictions are made, however, the predictions become uncertain and the track is terminated. A single track termination may cause the tracking of a vehicle to terminate.

Figure 17:
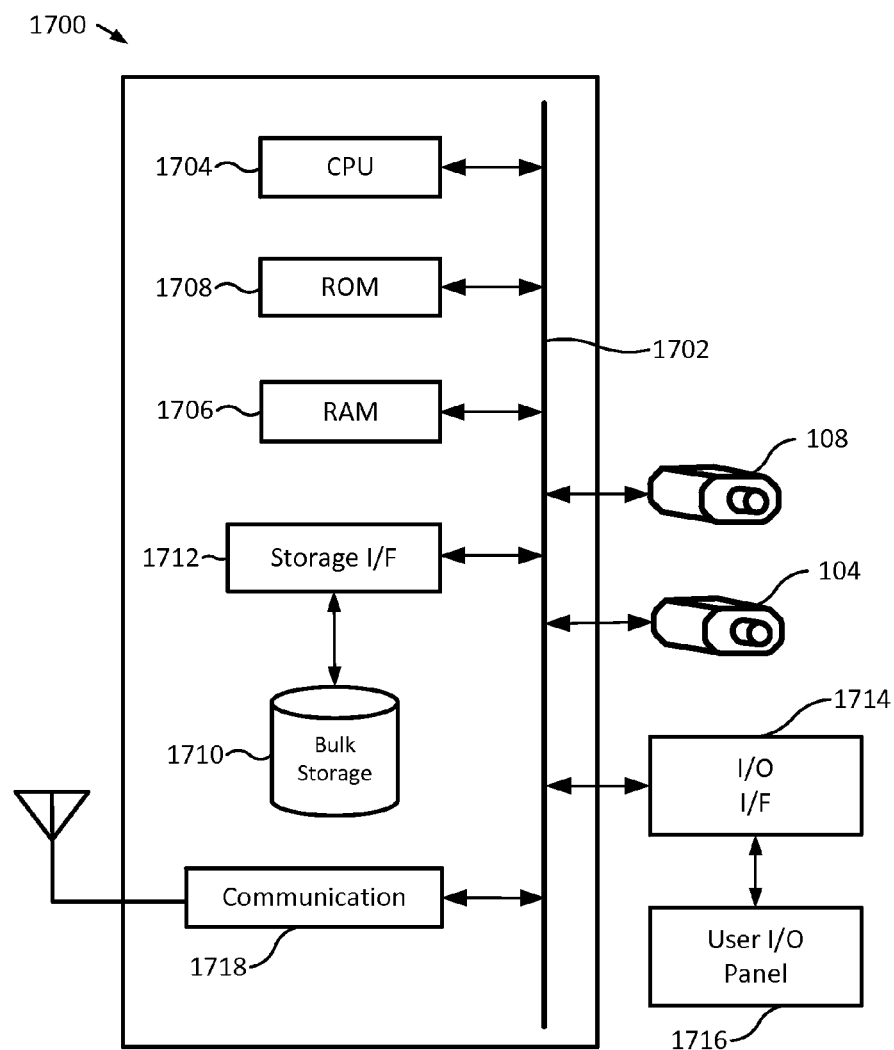
FIG. 17 is a block diagram that illustrates a computer system which an example embodiment can be implemented.

FIG. 17 is a block diagram that illustrates a computer system 1600 upon which an example embodiment may be implemented. Computer system 1600 may be employed to implement the functionality of Vehicle Detection and Measuring Module 106 described herein.

Computer system 1700 includes a bus 1702 or other communication mechanism for communicating information and a processor 1704 coupled with bus 1702 for processing information. Computer system 1700 also includes a main memory 1706, such as random access memory (RAM) or other dynamic storage device coupled to bus 1702 for storing information and instructions to be executed by processor 1704. Main memory 1706 also may be used for storing a temporary variable or other intermediate information during execution of instructions to be executed by processor 1704. Computer system 1700 further includes a read only memory (ROM) 1708 or other static storage device coupled to bus 1702 for storing static information and instructions for processor 1704. A storage device 1710, such as a magnetic disk, optical disk, and/or flash storage for storing information and instructions is coupled to bus 1702 via a Storage Interface (I/F) 1712.

Computer system 1700 may be coupled via Input/Output (I/O) (I/F) 1714 to a user interface 1716. The user interface 1716 may suitably comprise a display such as a cathode ray tube (CRT) or liquid crystal display (LCD), for displaying information to a computer user. The user interface 1716 may further comprise an input device, such as a keyboard including alphanumeric and other keys for communicating information and command selections to processor 1704. Another type of user input device is cursor control, such as a mouse, a trackball, cursor direction keys, and/or a touchscreen for communicating direction information and command selections to processor 1704 and for controlling cursor movement on the display. This input device typically has two degrees of freedom in two axes, a first axis (e.g. x) and a second axis (e.g. y) that allows the device to specify positions in a plane.

An aspect of the example embodiment is related to the use of computer system 1700 for image based vehicle detection and distance measuring. According to an example embodiment, image based vehicle detection and distance measuring is provided by computer system 1700 in response to processor 1704 executing one or more sequences of one or more instructions contained in main memory 1706. Such instructions may be read into main memory 1706 from another computer-readable medium, such as storage device 1710. Execution of the sequence of instructions contained in main memory 1706 causes processor 1704 to perform the process steps described herein. One or more processors in a multi-processing arrangement may also be employed to execute the sequences of instructions contained in main memory 1706. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1704 for execution. Such a medium may take many forms, including but not limited to non-volatile media, and volatile media. Non-volatile media include for example optical or magnetic disks, such as storage device 1710. Volatile media include dynamic memory such as main memory 1706. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD, Optical disk, or any other memory chip or cartridge, or any other medium from which a computer can read.

Computer system 1700 also includes a communication interface 1718 coupled to bus 1702. Communication interface 1718 provides a two-way data communication coupling computer system 1700 to an external device. Although example illustrated in FIG. 17 shows a wireless connection, those skilled in the art should readily appreciate that communication interface 1718 may be coupled to a wired (or wireline) connection.

Figure 2:
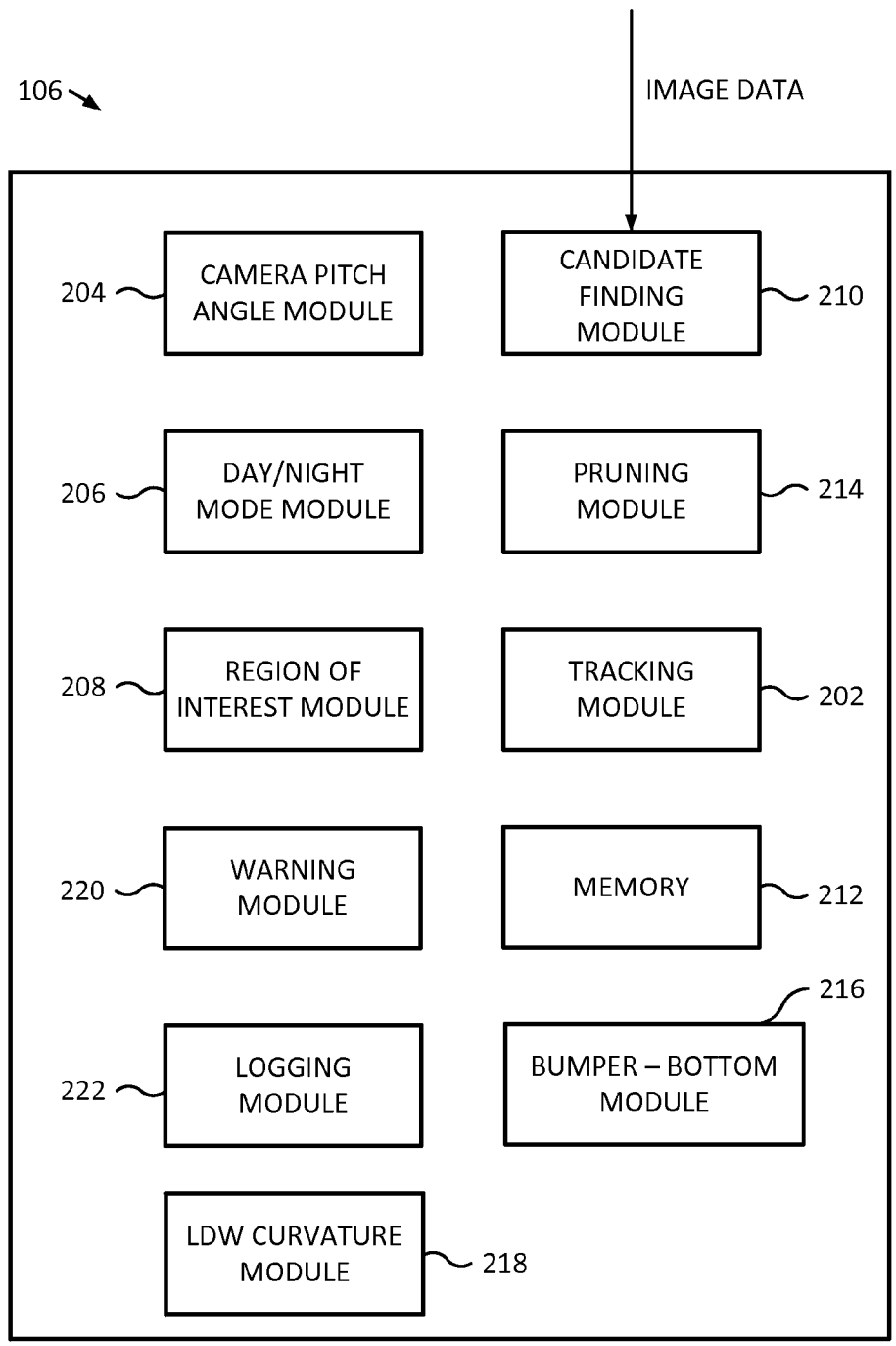
FIG. 2 illustrates an example of modules present in an image based vehicle detection and distance measuring processing module

In view of the foregoing structural and functional features described above, methodologies in accordance with example embodiments will be better appreciated with reference to FIGS. 18-22. While, for purposes of simplicity of explanation, the methodologies of FIGS. 18-22 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein is suitably adapted to be implemented in hardware, software, or a combination thereof. For example, the methodologies may be implemented by computer system 1700 (FIG. 17) and/or one or more modules of vehicle detection and measuring module 106 (FIGS. 1 and 2).

Figure 18:
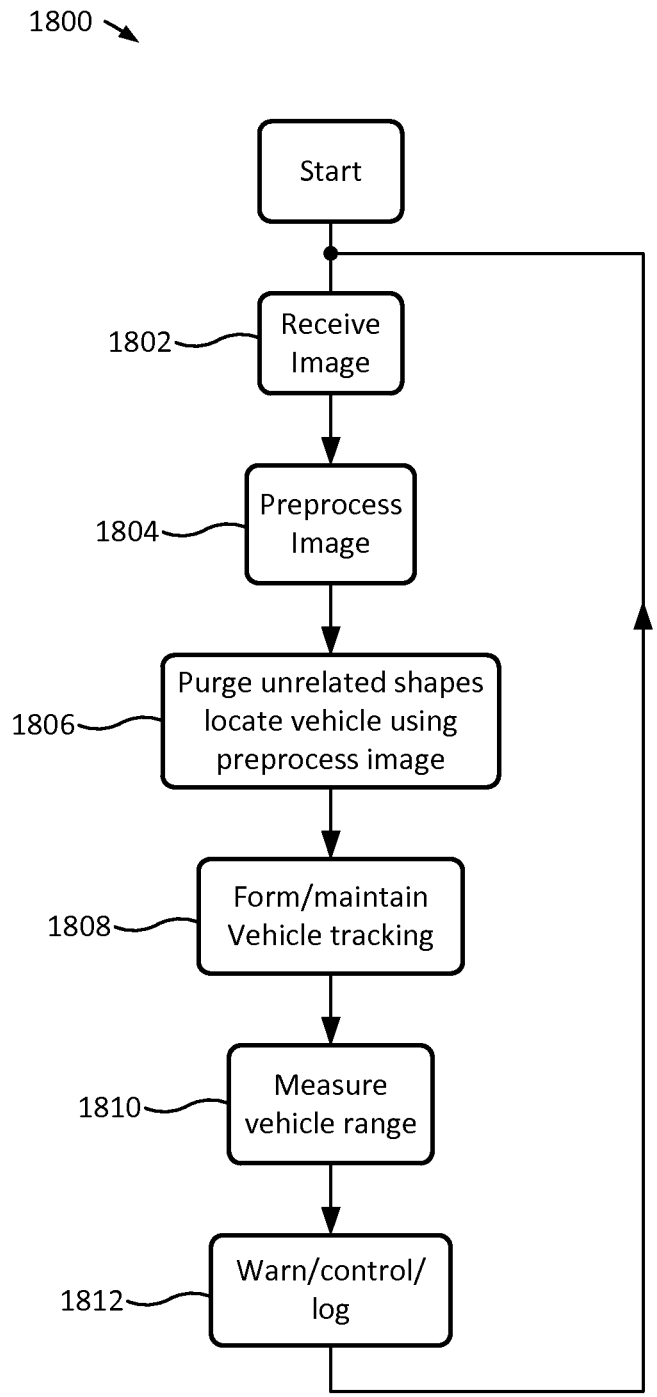
FIG. 18 is a flowchart illustrating an example a forward collision warning method.

FIG. 18 illustrates a forward collision warning method 1800. At 1802, an image is received. The image may be received from an image capturing device such as a camera or other suitable image capturing device.

At 1804, the image is pre-processed. The image is searched for shapes depending on whether the image is a daytime image or a nighttime image. For example, in a daytime image, the shape is searched U/H shapes as described herein while in a nighttime image pairs of bright areas may be paired and single bright spots may be isolated as described herein. As described in more detail herein, the pre-processing may include a rating function to identify the strongest U/H shapes and/or a search of a region of interest may be performed. In particular embodiments, a search for function extreme values may be employed to speed up the search. Other embodiments may determine acceptable U/H shapes by reusing previously calculated fill and gap values or recursion.

At 1806, the pre-processed image is pruned. As described herein, pruning involves identifying and removing superfluous U/H shapes. For example, many candidates may be found for a vehicle during the search for acceptable U/H shapes. Some of these candidates can be eliminated, because, for example, they have the same left and right (side) locations, whereas one bottom is just above the other. Because the bottom is above the other, it is further away, and thus not needed for the distance measurement. For examples, shapes may be pruned where a candidate shape is above a U/H that is lower in the image, but with the same sides. Other rules for determining whether to keep or prune a shape are also described herein.

At 1808, tracks (areas of presumed object motion) are assembled and a history is maintained. For example, a history of detected target U shapes can be organized by pyramid level, lane, vehicle style (for example, 2-wheeled or 4-wheeled vehicles, one with narrow U shapes and the other wide U shapes), bottom edge row location, and bottom edge polarity (light over dark or dark over light). Within a pyramid level, within a lane, and for a vehicle style, the history is searched for peaks, so that any rows in this lane which are within or near a current target track are ignored, which can help to avoid starting a redundant track.

At 1810, the range of tracked vehicles is measured. The range may be measured using any suitable technique. For example, the range to a vehicle seen ahead can be estimated in daytime by assuming, in one method, that the road between the image capturing device the vehicle being observed is flat. Since the height of the camera is known, and the angle between the lower edge of the vehicle and horizontal can be determined from the image and the current pitch angle as described herein, a trigonometric relation can then be performed to give the range to the vehicle. This method has a potential of range uncertainty with increasing distance, as each vertical pixel covers more distance on the ground with increasing range.

Another suitable method relates the width (or more generally, the distance between any two points) of a vehicle to the range. The relation between the width and range is an inverse one, with, Range=constant/width. The constant is learned by accumulating range (using, for example, the flat road method above) and width measurements, and then averaging, calculating the median, or otherwise filtering, the constant. When a flat road-based lane measurement is not available (the vehicle bottom may perhaps not be visible, or sudden camera pitching may cause an implausible range as derived from the flat road model), then the width-based range can substitute, using the equation above. When a plausible flat-road-based range is available, then the physical width of the vehicle can be estimated. This physical width estimate improves with increasing time, as more measurements are accumulated. Fixed points within the vehicle can also be used to estimate the range.

Nighttime distance estimation may also use different methods. One such method assumes a distance between a pair of taillights (found as bright areas in the image), or an assumed height over ground. Most vehicles have a taillight separation of between 1.5 to 2.5 meters. A 2.0 meter separation may be taken as typical. The distance to the vehicle ahead is then given by Distance=2.0*(focal length of lens)/(physical separation between taillights in the image). The physical separation is measured as the horizontal pixel size times the difference between the column locations of the bright spots.

A second nighttime method assumes a height over the ground plane for a bright spot. As noted above, lights typically have, and an example embodiment assumes, heights over the ground plane of between 0.3 and 1.7 meters. The number of pixels equivalent to 0.3-1.7 meters is used to estimate the bottom location of the vehicle. From this bottom location, the flat road assumption can again be used to estimate the distance to the vehicle.

FIG. 15 illustrates the aforementioned examples of a daytime flat road model for ranging. FIG. 16 illustrates the two aforementioned examples of methods for nighttime ranging.

At 1812, log entries are generated and warnings may be generated when predetermined conditions are determined. For example, a warning may be provided if a detected vehicle is determined to be too close. The warning may be based on a function of range and vehicle speed.

Figure 19:
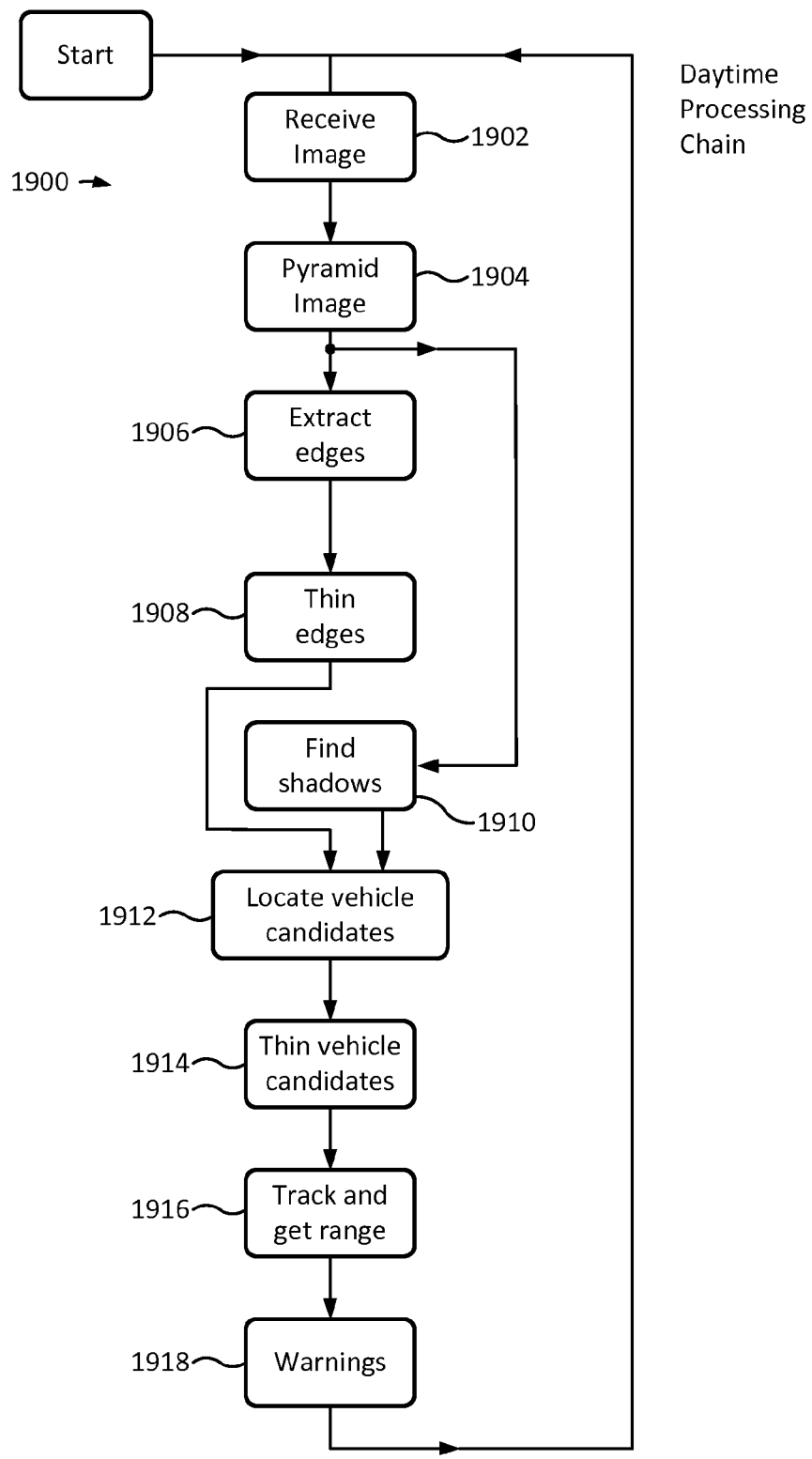
FIG. 19 illustrates an example of a method for locating vehicles during daytime.

FIG. 19 illustrates an example of a method 1900 for locating vehicles during daytime. Daytime vehicle modeling determines a vehicle's presence in an image by creating U and H shapes. Vehicles seen from behind during daylight hours have an approximately rectangular shape, with a vertical left edge where the left tire's outer edge is, a horizontal bottom edge where the ground shadow or bumper is, and a vertical right edge where the right tire's outer edge is. These horizontal and vertical edges are generally close to each other, with small gaps where the edges meet. These neighboring horizontal and vertical edges are used to locate vehicles in video images, where they make U or H shapes.

At 1902, an image is received. The image may be received from an image capturing device such as a camera or other suitable image capturing device.

At 1904, a pyramid-type image processing scheme is used to create multiple resolution levels. Vehicles vary in both size and the range to them. A small car 100 meters away may have a width of 5 pixels in the image, whereas a truck nearby can have a width of 200 pixels. The area that each covers is typically the width squared, and so varies between 25 and 40 000 pixels. Because of this large variation, and the ensuing large computation times for processing so many pixels, a pyramid resolution scheme is used. This scheme takes 2×2 groups of pixels and averages them, producing a coarser, new image with half the a pyramid-type image processing scheme is used to categorize U/H shapes using pixel blocks to identify multiple levels. Vehicles vary in both size and the range to them. A small car 100 meters away may have a width of 5 pixels in the image, whereas a truck nearby can have a width of 200 pixels. The area that each covers is typically the width squared, and so varies between 25 and 40 000 pixels. Because of this large variation, and the ensuing large computation times for processing so many pixels, a pyramid resolution scheme is used. This scheme takes 2×2 groups of pixels and averages them, producing a coarser, new image with half the rows and half the columns of the original. Closer vehicles, which would normally occupy many pixels in the normal image, cover correspondingly fewer in the coarser levels. Because the vehicles are closer, the vehicles are visible to approximately the same level of detail as those further away. All levels are then fed to an edge extraction scheme, described at 1906.

At 1906, the pyramid images then have edge extraction performed on them by the scheme noted above. In this embodiment, a centered-difference or Sobel edge extraction may be performed, resulting in a gradient image for pyramid levels. A stronger gradient magnitude indicates a stronger edge. The edge images are sent to a significant edge finder that links together weak, but still strong enough, edge pixels by considering their neighbors.

In a further aspect of this technique, U and H shapes begin to be formed by linking edges together. Gradient magnitude images are normally thresholded to locate the significant edges in them. These thresholded images may then be further processed to join separate segments that, e.g. have a second weak, but still important enough, gradient magnitude pixel(s) between them. The result is an edge image, thresholded with a particular level, with weak gaps closed and/or ends added. The two thresholds are chosen to reduce noise.

A different, simpler, faster model-based, scheme may also be used, where it is known that vehicle boundaries usually consist of horizontal and vertical segments. An edge model, consisting of weak—but contiguously located—gradients finds sufficiently long edges. The minimum length is given by the sizes of vehicles, with vertical lengths of greater than 0.2 meters required for motorcycles and 0.1 meters for bicycles, and horizontal lengths of typically 0.85 to 1.0 or more meters required for cars, trucks, and other four-wheeled objects. No additional gap closing or end adding is required, making the edge extraction a fast process so as not to further slow down image processing.

The result is a list of vertical and horizontal edge segments. The gradients at non-edge locations no longer need to be re-examined later, as the list now comprises all pixel locations with edges present, with no non-edge locations included. This compression into a list, without any non-edge segments, increases the computational speed later, when the edges are combined to form U or H shapes.

At 1908, edge thinning is performed. Because the edge segments produced by the coherence-based method are often touching each other, but with different lengths or strengths, the shorter or weaker of these segments can be removed, or thinned, thus increasing image processing speed without losing detections. Edge thinning examines neighboring rows and columns of edges. Edges have a length and a gradient magnitude, or strength. When edges in two different rows/columns touch, then the decision is made which portions of these to remove.

At 1910, the image is searched for shadows. Vehicles, buildings, weather conditions, etc. may cast or cause shadows, leading to obscuration of vehicle edges, depending on the geometry. Because of the obscuration of the edges, which would cause a finder in the U/H model to not find vehicles were it only based on edges, one must also allow dark pixels to function as edges. The determination of what gray level is sufficiently dark is done by examining the statistics of the image or portions of the image in the region of interest, described further herein, found in the different pyramid levels. A typical gray level for shadows is between 60 and 100 in an 8-bit gray level image.

At 1912, vehicle candidates are located. Vehicle candidates can be identified by forming U and H shapes as described herein.

At 1914, the set of vehicle candidates is thinned. The set is thinned by determining which candidates are false candidates and rejecting them. Suitable techniques for thinning vehicle candidates are described herein.

At 1916, the remaining vehicles are tracked and their ranges are determined. Ranging techniques described herein may be employed. If there are any vehicles that are too close, warnings may be provided as illustrated at 1918.

Figure 20:
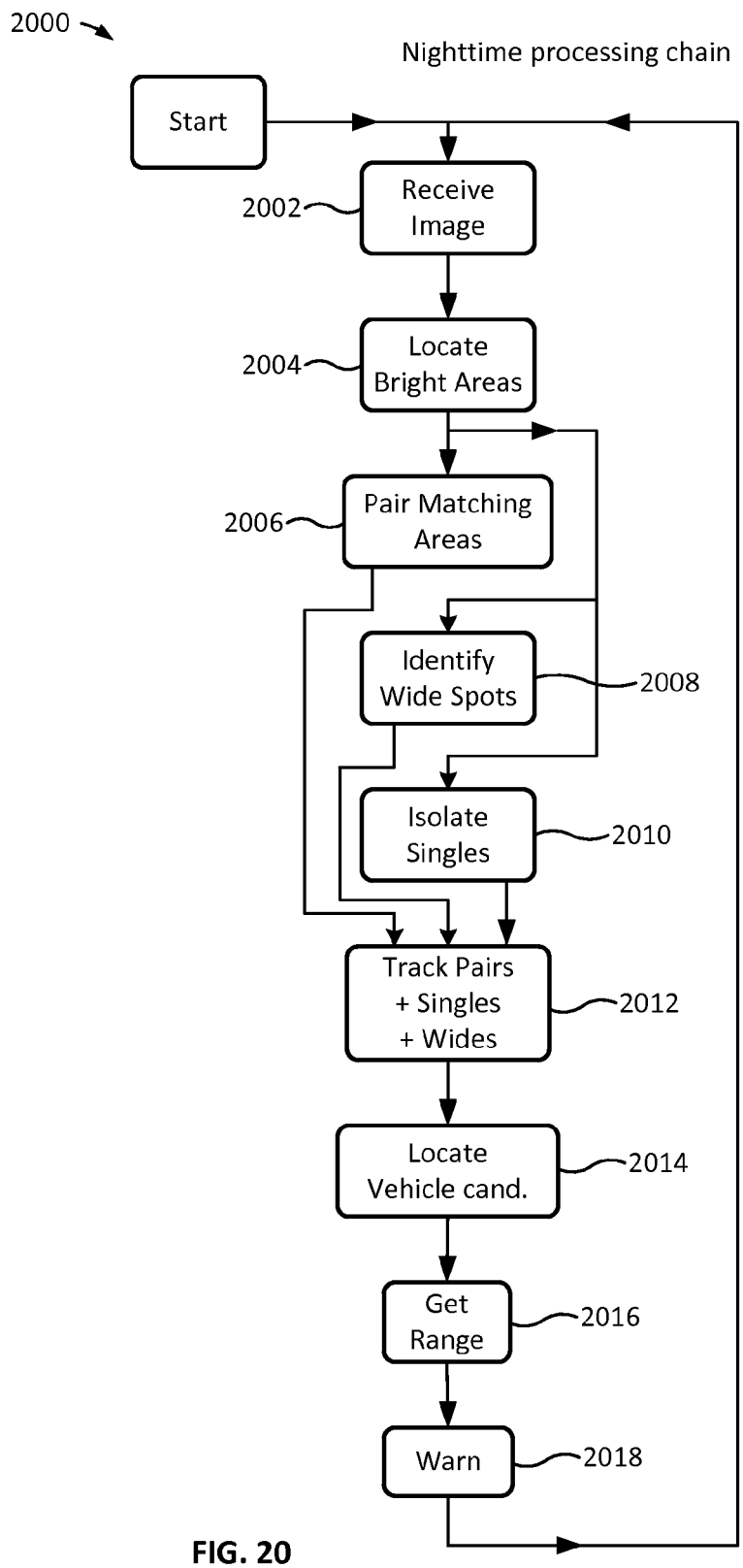
FIG. 20 illustrates an example of a method for locating vehicles at night.

FIG. 20 illustrates an example of a method for locating vehicles at night. Nighttime vehicle modeling examines bright areas in an image to identify vehicles. These bright areas may be associated with vehicle lights, or with the illuminated portion of a vehicle if it is close enough. Cars and trucks will typically have a pair of similar lights that define their outer edges, whereas a nearby vehicle will have its width illuminated. Motorcycles and bicycles will have a single or possibly two lights that define its location.

At 2002, an image is received. The image may be received from an image capturing device such as a camera or other suitable image capturing device.

At 2004, bright areas in the image are located. Bright areas may correspond to taillights and/or headlights of a vehicle.

At 2006, headlight pairs are matched. Cars and trucks will typically have a pair of similar lights that define their outer edges. Motorcycles and bicycles will have a single or possibly double lights to define their location. Several characteristics of vehicle lights can be assumed to analyze potential candidates. For example, vehicle lights generally come in pairs, in about the same image row, and when in pairs, are typically separated by approximately 2 meters. They also come in similar sizes, and in mirrored shapes, on the left and right. Vehicle lights also have shape bounds (limited aspect ratios) and come in typical sizes with given a spacing between them so that size bounds can be calculated. Vehicle lights also become dimmer with increasing range. An example embodiment assumes that vehicle lights are located between 0.3 and 1.7 meters over the ground when pairs, and approximately 60 cm over the ground when they are singles. These characteristics can be exploited to identify, pair and track lights over time, finally producing the range. Lights that are too far apart (e.g., wider apart than a lane width or other criterion) are identified at 2008 and are determined to be single lights. Lights that cannot be paired (singles) are isolated as illustrated at 2010.

At 2012, pairs of bright areas, single bright areas and wide areas are tracked over time. This enables vehicle candidates to be identified at 2014. Using an assumed distance between members of the pairs, an assumed height for the singles, and an assumed width for the wide areas, the ranges to the pairs and singles can be determined as illustrated at 2016. From the ranges, an example embodiment determines if warnings and/or logging are required as illustrated by 2018.

Figure 21:
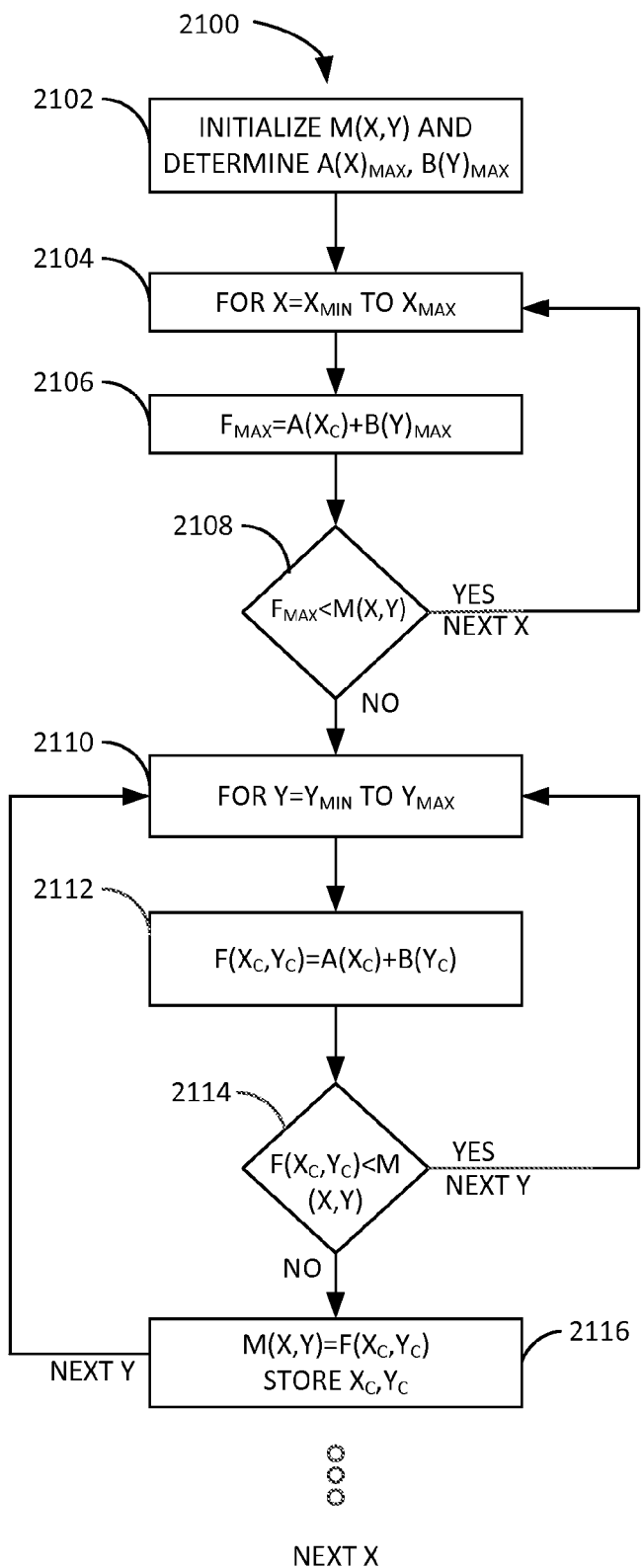
FIG. 21 illustrates a simplified example of a method for reducing the number of calculations used for an exhaustive search for function extreme values that can be employed to facilitate locating candidate vehicles from a received image.

FIG. 21 illustrates a simplified example of a method 2100 for reducing the number of calculations used for an exhaustive search for function extreme values. In an example embodiment, the techniques illustrated in method 2100 is employed to facilitate locating candidate vehicles from a received image.

Determination of extreme values can be an calculation intensive process. A brute-force approach to calculation of such values my involve calculation results associated with all possible input values, referred to herein as an "exhaustive search". With high input data rates and/or a large number of variables, the performance penalty associated with a large number of calculations can be substantial. This can be extremely problematic in systems that require real time, or near real time, monitoring or control, such as for example for image based vehicle detection and distance measuring.

Multivariable functions take multiple input values to produce a single output. The function z=x+y, for example, adds the two inputs, x and y, to produce the output z. Any number of inputs, in general, may be combined to produce an output. There may be intermediate steps applied to the inputs variables, such as in the function $z=x^2+\sin(y)$, where x is squared and a sine function is applied to y.

The example illustrated in FIG. 21 shows a two input function, F(X,Y) that has two sub-functions, A(X) and B(Y). However, those skilled in the art should readily appreciate that this example was selected merely for ease of illustration and that the principles described herein are applicable to functions having any number of variables, including functions with single variables but multiple sub-functions.

At 2102, the Maximum and/or Minimum function value M(X,Y) is initialized and an estimate of the maximum value of the sub-functions $A(X)_{MAX}$ and $B(Y)_{MAX}$ are determined (in this example the maximum value is estimated, however, in other embodiments where it is desired to find a minimum, an estimate of the minimum function values may be employed).

At 2104, a loop is entered. While in this loop, the first input variable, X, is varied from a minimum value, $X_{MIN}$ to a maximum value, $X_{MAX}$.

At 2106, a current possible maximum for the function, $F_{MAX}$, at the current value of X, $X_C$, is calculated. $F_{MAX}$ is calculated using the maximum value for B(Y), $B(Y)_{MAX}$. Thus, $F_{MAX}=A(X_C)+B(Y)_{MAX}$ At 2108, the current value of $F_{MAX}$ is compared to the current maximum, M(X,Y). If $F_{MAX}<M(X,Y)$ (e.g., the current possible maximum value for the current value of X ("$X_C$") cannot exceed the current maximum value) then no further evaluation needs to be done for the current value of X ("$X_C$"). In other words, the calculations from $Y_{Min}$ to $Y_{MAX}$ can be skipped. As those skilled in the art can readily appreciate, this can reduce the number of calculations performed in an exhaustive search. Moreover, selecting a higher initial value of M(X,Y) at 2102 can further reduce the number of calculations performed by the exhaustive search.

If at 2108, the current possible value of F(x,y) at the current value of X is less than the maximum value (YES), then processing returns to the beginning of the loop at 2104 and the next X is evaluated until $X_{MAX}$. If, however, at 2108, the current possible value of F(X,Y), $F_{MAX}$, is not less than M(X,Y) (NO), then the sub-function B(Y) is evaluated.

As illustrated at 2010, a second loop is entered for evaluating B(Y). B(Y) is evaluated from $Y_{MIN}$ to $Y_{MAX}$.

At 2112, the current value of F(X,Y)=is evaluated for the current value of X ($X_C$) and the current value of Y, ($Y_C$), or $F(X_C,Y_C)=A(X_C)+B(Y_C)$. At 2114, the current value of F(X,Y), $F(X_C,Y_C)$ is compared to the current maximum value M(X,Y).

If at 2114, $F(X_C,Y_C)$ is less than M(X,Y) (YES), the next value of Y is selected at 2110, until $Y_{MAX}$. If $Y_{MAX}$ is reached, then the next value of X is selected at 2104 until $X_{MAX}$ (note, this portion of the loop is not shown in FIG. 21 for ease of illustration).

If at 2114, $F(X_C,Y_C)$ is not less than M(X,Y) (NO), at 2116 the current maximum (M(X,Y)) is set to $F(X_C,Y_C)$ and the current values of X and Y, $X_C$ and $Y_C$ respectively are stored. The next value of Y is selected at 2110, until $Y_{MAX}$. If $Y_{MAX}$ is reached, then the next value of X is selected at 2104 until $X_{MAX}$.

As can be readily appreciated by one skilled in the art, once all of the values of X have been evaluated, M(X,Y) will be equal to the maximum for the function and the values of X and Y to reach that maximum value are identified. However, since Y is not evaluated for those values of X where the function could not possibly exceed the current maximum value, the number of computations in performing the exhaustive search are reduced. Those skilled in the art should also readily appreciate that the aforementioned technique can also be employed to reduce the number of calculations of an exhaustive search for a minimum value of a function, for example by changing the less than (<) comparisons in 2108 and 2114 to a greater than (>) comparison, and initializing M(X,Y) to a lower value may further reduce the number of calculations.

In functions which even larger numbers of sub-functions and/or input variables, this technique can be employed at multiple levels. For example, for a function F(x,y,z)=A(x, y,z)*{B(x,y,z)+C[D(x,z),D(y,z)]+E(x,z)+E(y,z)}, normalized so that the maximums for A(x,y,z), B(x,y,z), C[D(x,z), D(y,z)], E(x,z), and E(y,z) are 1, then the maximum possible value for F(x,y,z)=1*(1+1+1+1)=4. Any of the sub-functions, or combinations of the sub-functions can be evaluated and compared to the current maximum value M(x,y,z). For example, E(x,z) can be evaluated as $F_{MAX}=1(1+1+E(x,z)+1)$, or 3+E(x,z). If 3+E(x,z)<M(x,y,z), processing steps are saved by not having to further evaluate A(x,y,z), B(x,y,z), C[D(x,z),D(y,z)], and E(y,z) for the current values of x and z. But if the maximum value $F_{MAX}$ is not less than M(x,y), then the next sub-function can be evaluated, such as E(y,z), resulting in $F_{MAX}=1*[1+1+E(x,z)+E(y,z)]$, or 2+E(x,z)+E(y, z). If $F_{MAX}$ (the current possible value)<M(x,y,z) then A(x, y,z), B(x,y,z) and C[D(x,z),D(y,z)] do not need to be computed.

Figure 22:
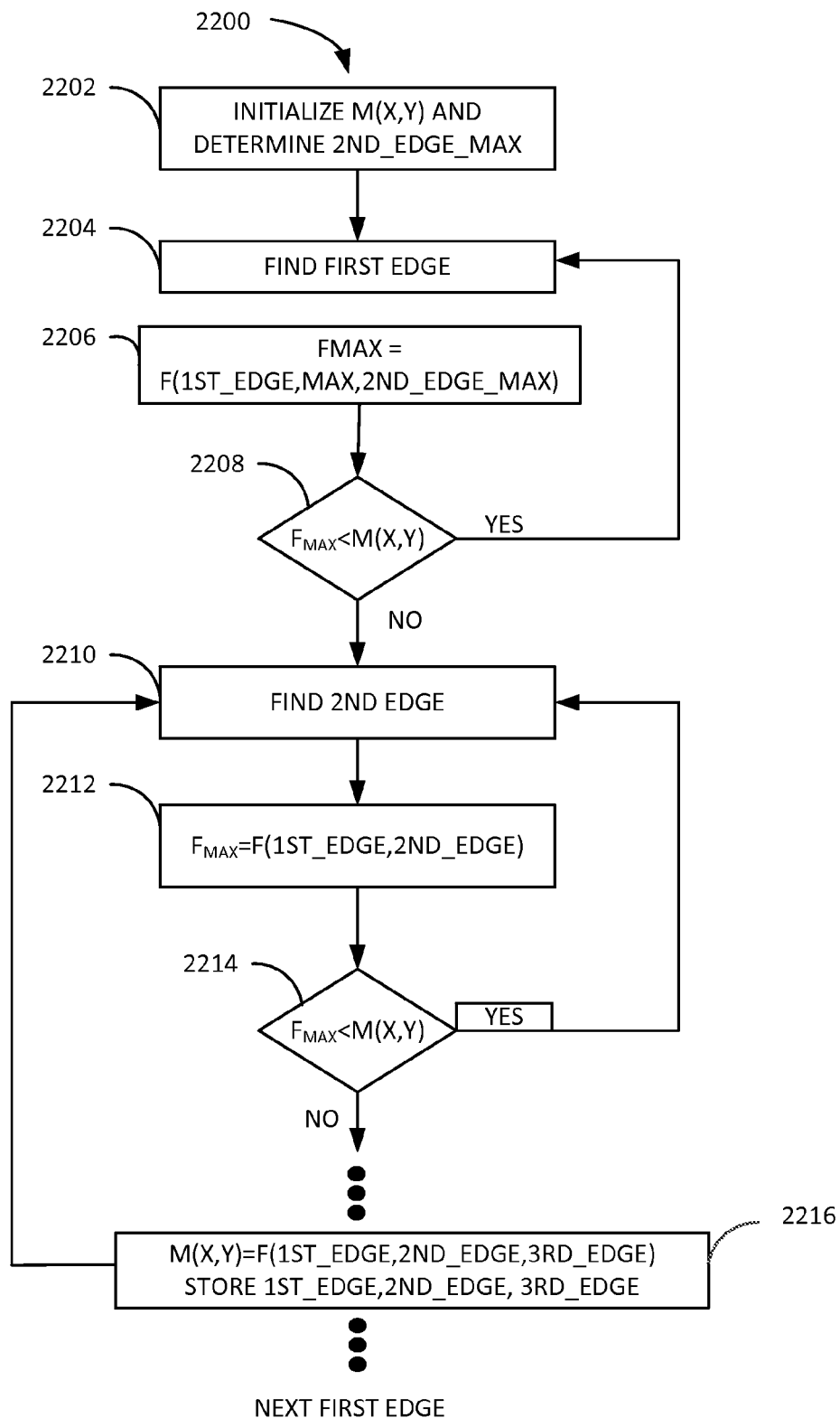
FIG. 22 illustrates an example methodology for image based vehicle detection based on the method illustrated in FIG. 21.

FIG. 22 illustrates an example methodology 2200 for image based vehicle detection based on of the method 2100 illustrated in FIG. 21. The methodology can be employed for construct a predefined shape, such as a U shape or a H shape based on the number or percentage of edge or dark pixels present in the image. The method 2200 illustrates the combination of sides (left, right) being searched, however, those skilled in the art can readily appreciate that the method 2200 can be extrapolated to also search for a horizontal (e.g., bottom) edge coupling the side edges. In an example, the function to be evaluated can be expressed as:

F(L,R,B)=K*fill(B)*((1−max horizontal gap in %)+Overlap(L and R locations of edges or dark pixels)+0.5*vertical fill(L)+0.5*vertical fill(R)) where L=Left edge, R=right edge, and B=bottom edge. The maximum for this function is 3*K. In an example embodiment, K may equal 33, therefore, in that embodiment the maximum value for the function is 99. However, K may equal any arbitrary or empirically derived value.

At 2202, the Maximum and/or Minimum function value M(X,Y) is initialized and an estimate of the maximum value of the fill for the $2^{nd}$ edge (2ND_edge_max) is calculated. In particular embodiments, an estimate for the maximum of a third edge (e.g., a horizontal edge coupled with the first and second edges) is also calculated. In an example embodiment, where K=33, or the maximum value of the function is 99, an empirical observation may be employed to determine a M(X,Y) suitable for rejecting unsuitable combinations—such as 40.

At 2204, a loop is entered. While in this loop, a row in the image is scanned for potential first edges. For example, if scanning from left to right, the first image would be the left edge, however, scanning from right to left (and locating right edges for the first edge) may also be performed.

At 2206, a current possible maximum for the function, $F_{MAX}$, for a first edge is computed. The fill for the first edge is calculated and a maximum fill for the second edge is employed. In particular embodiments, a maximum fill value for other edges, such as a third (e.g., bottom) edge, may also be included in the calculation for $F_{MAX}$.

At 2208, the current value of $F_{MAX}$ is compared to the combination of edges with the current maximum fill value, M(X,Y). If $F_{MAX}$<M(X,Y) (e.g., the current possible maximum value for the current first edge cannot exceed the current maximum value) then no further evaluation needs to be done for the current first edge. In other words, calculations with potential second edges can be skipped. As those skilled in the art can readily appreciate, this can reduce the number of calculations performed in an exhaustive search. Moreover, selecting a higher initial value of M(X,Y) at 2202 can further reduce the number of calculations performed by the exhaustive search.

For example, using the above example where K=33 and M(X,Z)=40, if $F_{MAX}$ is <40, then the current first edge is skipped and the search continues for a new first edge. For example, if the fill value for the current first edge is 0.2, then $F_{MAX}$=33*1*(1+(0.2+(1+0.2)/2))=33.8=59.4 If a shape has already been found with a value greater than 59.4, then no further calculations need to be performed with the current first edge.

If at 2208, the current possible value of F(x,y) at the current value of X is less than the maximum value (YES), then processing returns to the beginning of the loop at 2104 and the next potential first edge is evaluated until there are no more potential first edges left. If, however, at 2108, the current possible value of $F_{MAX}$ is not less than M(X,Y) (NO), at 2219 a search for potential second edges is initiated.

At 2212, the current value of $F_{MAX}$ is based on the current fill value for the first edge and the current fill value for the current second edge. In particular embodiments, $F_{MAX}$ at 2112 may also include a best possible fill value for a third edge (e.g., a bottom edge or a horizontal edge coupled with the side edges). At 2114, the current value of $F_{MAX}$ is compared to the current maximum value M(X,Y).

If at 2214, if $F_{MAX}$ is less than M(X,Y) (YES), a search for a new second edge is performed until there are no potential second edges remaining. If there are no more second edges remaining, then a new first edge is selected until there are no more first edges for the current row. (note, this portion of the loop is not shown in FIG. 22 for ease of illustration).

If at 2214, $F_{MAX}$ is not less than M(X,Y) (NO), at 2116 the current maximum, M(X,Y), can be set to $F_{MAX}$ and the locations of the first edge and second edges are stored. In particular embodiments, a third edge (e.g., a horizontal or bottom edge coupling the first and second edges) may also be evaluated. The search for combinations of edges in the row continues to the next potential second edge, until there are no available potential second edges on the current row. Then a search is performed for the remaining combinations of first and second edges until there are no combinations remaining.

As one skilled in the art can appreciate, from the foregoing, whenever an edge is rejected at 2208, searches and calculations for the 2nd edge and bottom edge can be skipped, resulting in computational savings. Similarly, whenever a 2nd edge is rejected at 2214, calculations for the bottom edge can be skipped, resulting in computational savings.

(Paragraph numbering) In particular embodiments, additional acts may further increase the efficiency of the method 2200. For example, edges may be sorted by fill value. As another example, edges beyond a preset vehicle width value may be ignored. Yet another example, recursive calculations may be employed as will be described in more detail herein (see e.g., FIG. 23).

Figure 23:
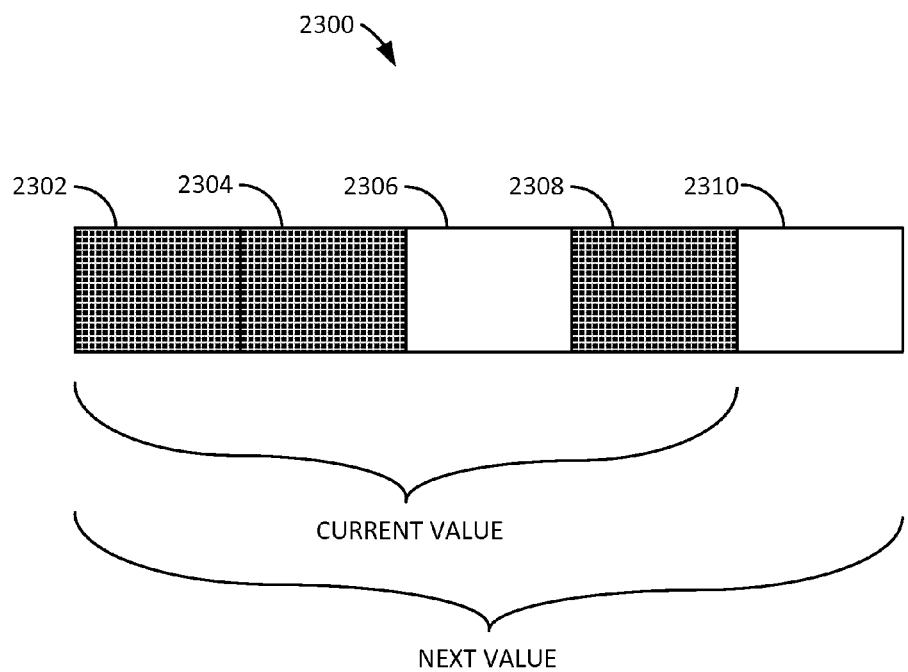
FIG. 23 illustrates a group of pixels input to an example of a recursive calculation.

FIG. 23 illustrates a group of pixels 2300 for illustrating an example of a recursive calculation. A current fill value has been calculated for pixels 2302, 2304, 2306, and 2308. Since pixels 2302, 2304, and 2308 are filled, the current value is ¾. When calculating the fill value for pixels for 2302, 2304, 2306, 2308, and 2310 (the new fill value), rather than starting over, the calculations for the current fill value are kept, and the value of pixel 2310 is added to the current value. The fill for pixel 2310 will either add a value of zero or one to the numerator, and a value of one to the denominator. Therefore, the new fill value will either by ⅗ or ⅘.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A system for numerical analysis of physical data comprising:
    an input operable to receive multiple, discrete data input values corresponding to a physical phenomenon of an associated physical system, wherein:
        a multivariable functional relationship associated with the physical phenomenon is defined by first and second subfunctions,
        each subfunction is operable on at least one data input value as a parameter of the multivariable functional relationship,
        the first subfunction is bounded between a first subfunction minimum value corresponding thereto and a first subfunction maximum value corresponding thereto, and
        the second subfunction is bounded between a second subfunction minimum value corresponding thereto and a second subfunction maximum value corresponding thereto;
    a memory operable to store received digital data;
    a processor operable to evaluate the first subfunction defining the functional relationship for each of a plurality of first data input values from the first subfunction minimum value to the first subfunction maximum value to determine, while holding a second subfunction of the multivariable functional relationship constant at the second subfunction maximum value, a first subfunction candidate maximum value resulting in a system maximum value achievable by the multivariable functional relationship;
    the processor being operable to evaluate the second subfunction for each of a plurality of second data input values from the second subfunction minimum value to the second subfunction maximum value to determine, while holding the first subfunction of the multivariable functional relationship constant at the first subfunction candidate maximum value, a second subfunction candidate maximum value resulting in the system maximum value achievable by the multivariable functional relationship; and an output operable to communicate the first and second subfunction candidate maximum values after termination to a monitoring system as extremum values so as to perform a monitoring operation relative to the associated physical system when the second subfunction candidate maximum value exceeds the system maximum value.

2. The system of claim 1 wherein the processor is further operable to order the first and second subfunctions such that a selected subfunction is selected as the first subfunction.

3. The system of claim 1 wherein the candidate maximum value is determined in accordance with a selected time duration.

4. The system of claim 1 further comprising an image sensor, and wherein the digital data values are comprised of image data captured from the image sensor.

5. The system of claim 4 wherein the image data includes data corresponding to at least one of visually proximate vehicle data and path data associated with an exterior of a vehicle associated with the image sensor.

6. The system of claim 2 wherein the processor is further operable to isolate the first subfunction in accordance with a property associated with early finding of high values relative to at least one other subfunction.

7. The system of claim 2 wherein the processor is further operable to isolate the first subfunction in accordance with having one having a greater influence on the candidate maximum value.

8. A method for numerical analysis for physical data comprising the steps of:
receiving multiple, discrete data input values corresponding to a physical phenomenon of an associated physical system, wherein:
a multivariable functional relationship associated with the physical phenomenon is defined by first and second subfunctions,
each subfunction is operable on at least one data input value as a parameter of the multivariable functional relationship,
the first subfunction is bounded between a first subfunction minimum value corresponding thereto and a first subfunction maximum value corresponding thereto, and
the second subfunction is bounded between a second subfunction minimum value and a second subfunction maximum value corresponding thereto;
storing received digital data in an associated data storage;
evaluating the first subfunction defining the functional relationship for each of a plurality of first data input values from the first subfunction minimum value to the first subfunction maximum value to determine, while holding a second subfunction of the multivariable functional relationship constant at the second subfunction maximum value, a first subfunction candidate maximum value resulting in a system maximum value achievable by the multivariable functional relationship;
evaluating the second subfunction for each of a plurality of second data input values from the second subfunction minimum value to the second subfunction maximum value to determine, while holding the first subfunction of the multivariable functional relationship constant at the first subfunction candidate maximum value, a second subfunction candidate maximum value resulting in a system maximum value achievable by the multivariable functional relationship;

comparing the second subfunction candidate maximum value to a system maximum value achievable by the multivariable functional relationship; and communicating the first and second subfunction candidate maximum values after termination to a monitoring system as extremum values so as to perform a monitoring operation relative to the associated physical system when the second subfunction candidate maximum value exceeds the system maximum value.

9. The method of claim 8 further comprising the step of ordering the first and second subfunctions such that a selected subfunction is selected as the first subfunction.

10. The method of claim 8 further comprising the step of determining the candidate maximum value is determined in accordance with a selected time duration.

11. The method of claim 8 further comprising the step of receiving the data input values as image data from an image sensor.

12. The method of claim 11 wherein the image data includes data corresponding to at least one of visually proximate vehicle data and path data associated with an exterior of a vehicle associated with the image sensor.

13. The method of claim 9 further comprising the step of isolating the first subfunction in accordance with a property associated with early finding of high values relative to at least one other subfunction.

14. The method of claim 9 further comprising the step of isolating the first subfunction in accordance with having one having a greater influence on the candidate maximum value.

15. An apparatus, comprising:
an image capturing device; and
a vehicle detection and measuring module coupled with the image capturing device;
the vehicle detection and measuring module being operable to receive an image from the image capturing device;
the vehicle detection and measuring module being operable to extract edge segments from the image;
the vehicle detection and measuring module being operable to search for a combination of edge segments that form a predefined shape to identify a vehicle;
the vehicle detection and measuring module being operable to store a maximum possible fill value for an estimated second edge segment of the predefined shape in the image from the image capturing device;
the vehicle detection and measuring module being operable to determine a fill value for a first edge segment corresponding in the image to a second edge segment of the predefined shape;
the vehicle detection and measuring module being operable to determine a maximum value possible using the fill value determined for the first edge segment of the predefined shape in the image and the maximum possible fill value for the estimated second edge segment of the predefined shape in the image;
the vehicle detection and measuring module being operable to compare the determined maximum value possible to a predefined threshold;
the vehicle detection and measuring module being operable to selectively reject the combination of the first edge segment and the second edge segment corresponding in the image to the first edge segment as forming the predefined shape without further evaluating the second edge segment responsive to determining that the determined maximum value possible is less than the predefined threshold; and the vehicle detection and measuring module being operable to selectively use the first edge segment responsive to determining that the determined maximum value possible is greater than the predefined threshold for further evaluating whether the second edge segment corresponding in the image to the first edge segment forms the predefined shape in the image by:
determining a fill value for the second edge segment corresponding in the image to the first edge segment of the predefined shape;
determining a maximum value possible using the fill value determined for the second edge segment of the predefined shape in the image and the determined fill value for the first segment of the predefined shape in the image;
comparing the determined maximum value possible to the predefined threshold; and
selectively rejecting the combination of the first edge segment and the second edge segment corresponding in the image to the first edge segment as forming the predefined shape without further evaluating the first edge segment responsive to determining that the determined maximum value possible is less than the predefined threshold, or
selectively accepting the combination of the first edge segment and the second edge segment corresponding in the image to the first edge segment as forming the predefined shape responsive to determining that the determined maximum value possible is greater than the predefined threshold.

16. The apparatus set forth in claim 15, wherein the predefined threshold is a fill value for a previously evaluated combination of edges.

17. The apparatus set forth in claim 16, wherein the vehicle detection and measuring module is operable to search for a third edge coupling a first edge and a second edge responsive to finding a combination of a first edge and a second edge that is not less than the predefined threshold.

18. The apparatus set forth in claim 15, wherein the vehicle detection and measuring module sorts the edge segments by fill density prior to searching for the combination of edge segments.

19. The apparatus set forth in claim 15, the vehicle detection and measuring module is operable to track a vehicle identified by the combination of edges.

20. The apparatus set forth in claim 19, the vehicle detection and measuring module is operable to determine the range of the identified vehicle.

21. The apparatus set forth in claim 20, the vehicle detection and measuring module is operable to generate an alarm responsive to determining the range of the vehicle is less than a predefined threshold.

22. The apparatus set forth in claim 15, wherein the predefined shape is a U shape.

23. The apparatus set forth in claim 15, wherein the predefined shape is an H shape.

24. The apparatus set forth in claim 15, wherein the vehicle detection and measuring module is operable to search for a combination of edge segments that form one of a plurality of predefined shapes to identify a vehicle.

25. The apparatus set forth in claim 24, wherein the plurality of predefined shapes comprises a U shape and a H shape.

26. A non-transitory tangible computer readable storage medium for storing computer readable instructions for execution by a processor, and when executed operable to:
receive an image from the image capturing device;
extract edge segments from the image;
search for a combination of edge segments that form a predefined shape to identify a vehicle;
store a maximum possible fill value for an estimated second edge segment of the predefined shape in the image from the image capturing device;
determine a fill value for a first edge segment corresponding in the image to a second edge segment of the predefined shape;
determine a maximum value possible using the fill value determined for the first edge segment of the predefined shape in the image and the maximum possible fill value for the estimated second edge segment of the predefined shape in the image;
compare the maximum value possible to a predefined threshold;
selectively reject the combination of the first edge segment and the second edge segment corresponding in the image to the first edge segment as forming the predefined shape without further evaluating the second edge segment responsive to determining that the determined maximum value possible is less than the predefined threshold; and
selectively use the first edge segment responsive to determining that the determined maximum value possible is greater than the predefined threshold for further evaluating whether the second edge segment corresponding in the image to the first edge segment forms the predefined shape in the image by:
determining a fill value for the second edge segment corresponding in the image to the first edge segment of the predefined shape;
determining a maximum value possible using the fill value determined for the second edge segment of the predefined shape in the image and the determined fill value for the first segment of the predefined shape in the image;
comparing the determined maximum value possible to the predefined threshold; and
selectively rejecting the combination of the first edge segment and the second edge segment corresponding in the image to the first edge segment as forming the predefined shape without further evaluating the first edge segment responsive to determining that the determined maximum value possible is less than the predefined threshold, or
selectively accepting the combination of the first edge segment and the second edge segment corresponding in the image to the first edge segment as forming the predefined shape responsive to determining that the determined maximum value possible is greater than the predefined threshold.

27. The non-transitory tangible computer readable medium of claim 26, wherein the predefined threshold is a fill value for a previously evaluated combination of edges.

28. The non-transitory tangible computer readable medium of claim 26, further operable to search for a third edge coupling a first edge and a second edge responsive to finding a combination of a first edge and a second edge that is not less than the predefined threshold.

29. The non-transitory tangible computer readable medium of claim 26, further operable to sort the edge segments by fill density prior to searching for the combination of edge segments.

30. The non-transitory tangible computer readable medium of claim 26, further operable to:
search for a combination of edge segments that form one of a plurality of predefined shapes to identify a vehicle;
wherein the plurality of predefined shapes comprises a U shape and a H shape.

31. An apparatus, comprising:
an image capturing device;
a vehicle detection and measuring module coupled with the image capturing device;
the vehicle detection and measuring module is operable to receive an image from the image capturing device;
the vehicle detection and measuring module is operable to extract edge segments and shadow pixels from the image;
the vehicle detection and measuring module is operable to search for a combination of edge segments and shadow pixels that form a predefined shape to identify a vehicle;
the vehicle detection and measuring module stores a maximum possible fill value for an estimated second edge segment and second shadow pixels of the predefined shape in the image from the image capturing device;
the vehicle detection and measuring module determines a fill value for a first edge segment and first shadow pixels corresponding in the image to a second edge segment and to the second shadow pixels of the predefined shape;
the vehicle detection and measuring module determines a maximum value possible using the fill value determined for the first edge segment and the first shadow pixels of the predefined shape in the image and the maximum possible fill value for the estimated second edge segment and the second shadow pixels of the predefined shape in the image;
the vehicle detection and measuring module compares the determined maximum value possible to a predefined threshold;
the vehicle detection and measuring module selectively rejects the combination of the first of the group consisting of an edge segment and shadow pixels, and the second of the group consisting of an edge segment and shadow pixels corresponding in the image to the first edge segment as forming the predefined shape without further evaluating the second of the group consisting of an edge segment and shadow pixels responsive to determining that the determined maximum value possible is less than the predefined threshold; and
the vehicle detection and measuring module selectively uses the first edge segment responsive to determining that the determined maximum value possible is greater than the predefined threshold for further evaluating whether the second edge segment corresponding in the image to the first edge segment forms the predefined shape in the image by:
determining a fill value for the second edge segment corresponding in the image to the first edge segment of the predefined shape;
determining a maximum value possible using the fill value determined for the second edge segment of the predefined shape in the image and the determined fill value for the first segment of the predefined shape in the image;
comparing the determined maximum value possible to the predefined threshold; and
selectively rejecting the combination of the first edge segment and the second edge segment corresponding in the image to the first edge segment as forming the predefined shape without further evaluating the first edge segment responsive to determining that the determined maximum value possible is less than the predefined threshold, or
selectively accepting the combination of the first edge segment and the second edge segment corresponding in the image to the first edge segment as forming the predefined shape responsive to determining that the determined maximum value possible is greater than the predefined threshold.

32. The apparatus set forth in claim 31, wherein the predefined threshold is a fill value for a previously evaluated combination.

33. The apparatus set forth in claim 32, wherein the vehicle detection and measuring module is operable to search for a third edge or shadow pixels, coupling a first edge or shadow pixels, and a second edge or shadow pixels responsive to finding a combination of a first edge and shadow pixels, and a second edge or shadow pixels that is not less than the predefined threshold.

34. The apparatus set forth in claim 31, wherein the vehicle detection and measuring module sorts the edge and shadow segments by fill density prior to searching for the combination of edge and shadow segments.

35. The apparatus set forth in claim 31, wherein the first of the group consisting of an edge segment and shadow pixels is an edge segment and the second of the group consisting of an edge segment and shadow pixels is shadow pixels.

36. The apparatus set forth in claim 31, wherein the first of the group consisting of an edge segment and shadow pixels is shadow pixels and the second of the group consisting of an edge segment and shadow pixels is an edge segment.

37. The apparatus set forth in claim 31, wherein the vehicle detection and measuring module is operable to search for a combination of edge segments and shadow pixels that form one of a plurality of predefined shapes to identify a vehicle.

38. The apparatus set forth in claim 37, wherein the plurality of predefined shapes comprises a U shape and a H shape.

* * * * *